United States Patent [19]

Mahrer

[11] Patent Number: 5,010,527

[45] Date of Patent: Apr. 23, 1991

[54] METHOD FOR DETERMINING THE DEPTH OF A HYDRAULIC FRACTURE ZONE IN THE EARTH

[75] Inventor: Kenneth D. Mahrer, Dallas, Tex.

[73] Assignee: Gas Research Institute, Chicago, Ill.

[21] Appl. No.: 277,559

[22] Filed: Nov. 29, 1988

[51] Int. Cl.$^5$ .............................................. G01V 1/40
[52] U.S. Cl. ..................................... 367/86; 367/35; 367/34; 166/254
[58] Field of Search ................ 367/33, 34, 35, 25, 367/86; 181/102, 105, 106, 116; 166/250, 254

[56] References Cited

U.S. PATENT DOCUMENTS

| | | | |
|---|---|---|---|
| 1,909,205 | 5/1933 | McCollum | 367/58 |
| 2,596,843 | 5/1952 | Farris | 166/283 |
| 2,951,535 | 9/1960 | Mihram et al. | 166/254 |
| 3,205,941 | 9/1965 | Walker | 166/254 |
| 3,306,102 | 2/1967 | Lebourg | 73/155 |
| 3,332,483 | 7/1967 | Wyllie | 166/254 |
| 3,356,177 | 12/1967 | Loren | 367/30 |
| 3,402,769 | 9/1968 | Doggett et al. | 166/254 |
| 3,427,652 | 2/1969 | Seay | 166/250 |
| 3,586,105 | 6/1971 | Johnson et al. | 166/250 |
| 3,739,871 | 6/1973 | Bailey | 367/37 |
| 4,057,780 | 11/1977 | Shuck | 367/86 |
| 4,109,717 | 8/1978 | Cooke, Jr. | 166/250 |
| 4,280,200 | 7/1981 | Silverman | 367/37 |
| 4,319,346 | 3/1982 | MacDonald | 367/32 |
| 4,328,567 | 5/1982 | Dodge | 367/32 |
| 4,398,416 | 8/1983 | Nolte | 73/155 |
| 4,420,975 | 12/1983 | Nagel et al. | 73/155 |
| 4,432,078 | 2/1984 | Silverman | 367/37 |
| 4,440,020 | 4/1984 | Boutemy et al. | 73/152 |
| 4,442,895 | 4/1984 | Lagus et al. | 166/250 |
| 4,458,245 | 7/1984 | Crosnier et al. | 367/35 |
| 4,524,434 | 6/1985 | Silverman | 367/37 |
| 4,638,254 | 1/1987 | Uhri | 73/152 |
| 4,749,038 | 6/1988 | Shelley | 166/250 |
| 4,802,144 | 1/1989 | Holzhausen et al. | 367/35 |

OTHER PUBLICATIONS

"Overview of Current Hydraulic Fracturing Design and Treatment Technology, Part I" by R. W. Veatch, Jr., Apr. 1983, Journal of Petroleum Technology, pp. 677-687.

"Overview of Current Hydraulic Fracturing Design and Treatment Technology, Part II" by R. W. Veatch, Jr., May 1983, Journal of Petroleum Technology, pp. 853-864.

"Advances in the Microseismic Method of Hydraulic Fracture Azmith Estimation" by Sorrells and Mulcahy, Society of Petroleum Engineers, pub. 15216, 1986, pp. 109-115.

Primary Examiner—Thomas H. Tarcza
Assistant Examiner—Ian J. Lobo
Attorney, Agent, or Firm—Dowell & Dowell

[57] ABSTRACT

The depth of a hydraulic fracture zone is determined by sensing and recording seismic wave motion at a series of spaced depths in a portion of a bore hole subjected to fracturing pressure during a shut-in period after the application of pressure while the fracture zone is unstable, and analyzing such motion recordings by eliminating components not attributable to the fracturing and discrete components from seismic sources attributable to the fracturing to determine an average background level of vertical and horizontal components, and comparing the average background level of the horizontal components of motion to the vertical component of motion to provide an indication of the presence or absence of fracturing at each depth.

40 Claims, 21 Drawing Sheets

FIG. 2
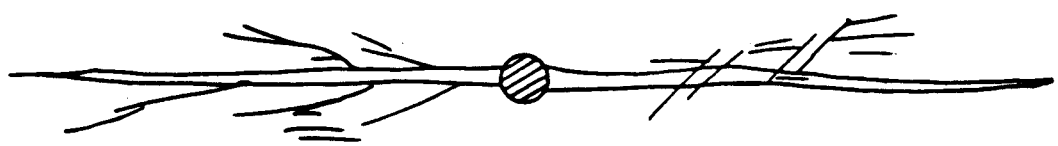
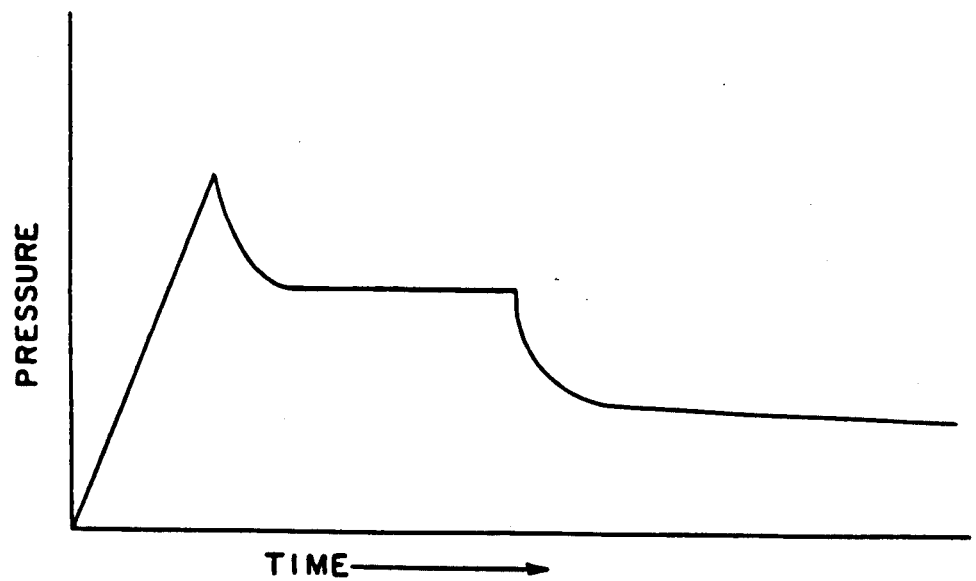
FIG. 3

(1)
RECORD complete motion in the treated well at multiple depths prior to, during, and/or after a hydraulic pressurization.

(2)
CALCULATE total motion root-mean-square (RMS) vs time at each recording depth.

(3)
CALCULATE power spectrum for each component of motion at each recording depth during time periods of lowest activity level.

(4)
PLOT power spectra of total motion, complete horizontal motion, vertical motion, and spectral ratio of complete horizontal motion to vertical motion ratio at each recording depth.

(5)
DETERMINE frequency band(s) in recorded data spectra that contain elements not attributable to pressurization.

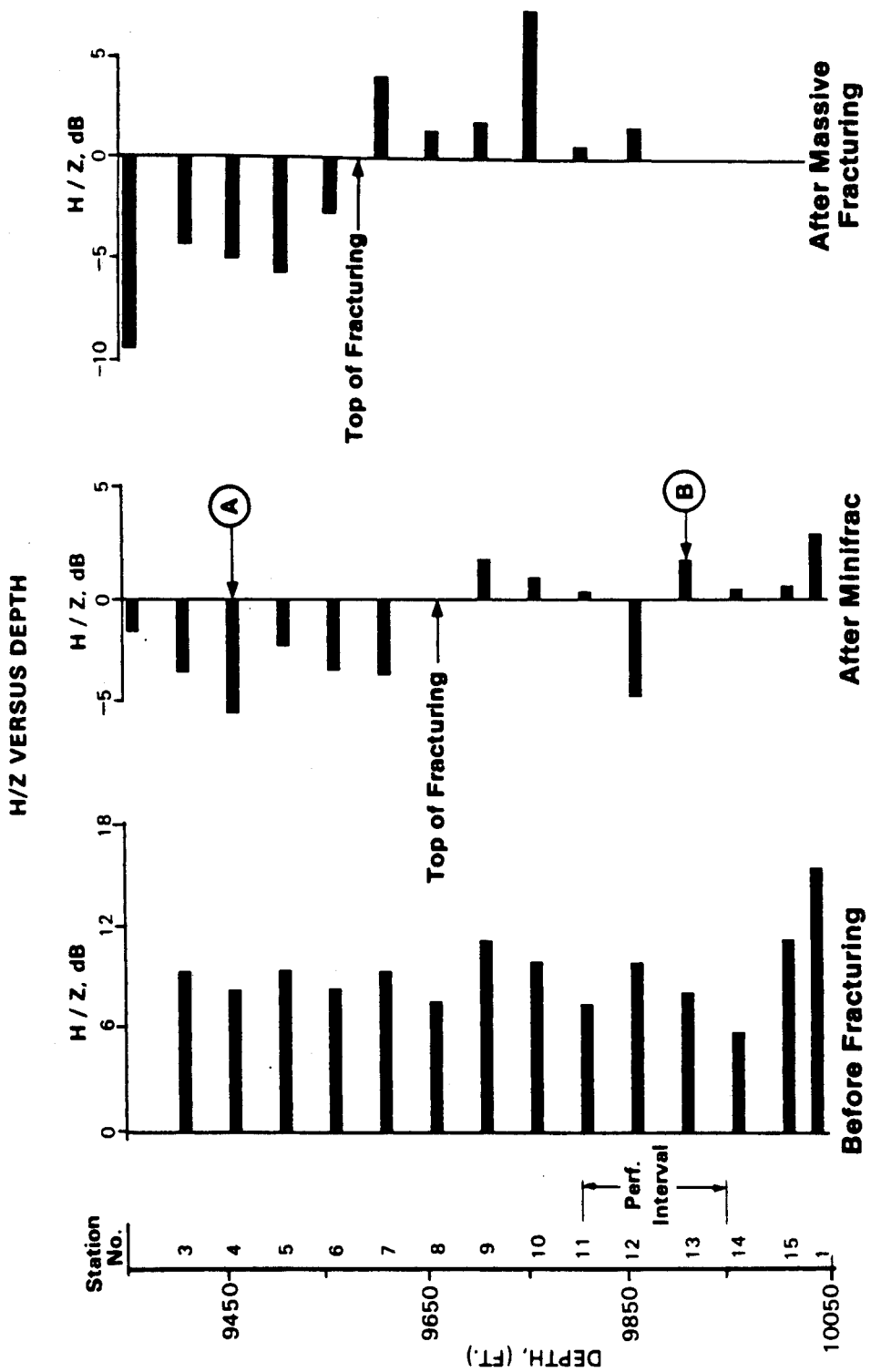
FIG. 21c After Massive Fracturing
FIG. 21b After Minifrac
FIG. 21a Before Fracturing

METHOD FOR DETERMINING THE DEPTH OF A HYDRAULIC FRACTURE ZONE IN THE EARTH

BACKGROUND OF THE INVENTION

1. Field of the Invention

Economical availability of oil and gas from geological reservoirs has been and remains of immeasurable importance. Such reservoirs vary in accessibility from wells of a few hundred feet to over two miles in depth.

In order to attain fuller recovery in a given time from what is otherwise available, a technique of fracturing the rock in underground formations has been practiced since at least as early as 1949. See the U.S. Pat. No. 2,596,843, to Farris, and the publications, Parts 1 and 2, entitled "Overview of Current Hydraulic Fracturing Design and Treatment Technology" by R. W. Veatch, Jr., from the April and May 1983 issues of Journal of Petroleum Technology, pages 677-687 and 853-864. The latter discusses hydraulic fracturing techniques, characteristics and surveys of fractures based on temperature, pressure, radioactivity, and acoustical data.

Such fracturing involves pumping fluid into a well at a selected level at sufficient pressure to produce separation of portions of the formation. This typically results in some leak-off of the fluid and a reduction in the pressure level. The fracture may usually be extended by continued pumping of fluid into it.

In order to enhance oil or gas recovery, a granular substance such as silica sand is pumped into the crevice to prop the portions apart upon the decline of fluid pressure.

Since the fracture treatment is directed at levels viewed as likely to contain reservoirs, it is often carried out at deep depths, as mentioned above.

Such fracture treatment involves large outlays for equipment and pumping fluid and must, therefore, be tailored to suit each individual environment. Furthermore, in a given area, there may be a multiplicity of wells whose spatial and other relationship requires a particular fracture design.

Attempts to determine the specific nature of fractured formations have been made through various procedures in the past in order to enable the designer to learn the results of fracture designs and to produce fracturing with predictable results. Once a hydraulic fracture treatment has been performed, delineating the actual location (depth to the top) and vertical extent (height) of the affected zone is important. The actual fracture that occurs may differ substantially from the designed fracture. For example, fractures can break through natural geologic barriers which were anticipated to contain the fracture. Fractures may grow down when predicted to grow up and out. In some cases, no reliable pretreatment prediction can be made.

Hence, independent confirmation or delineation of fracture depth and height is needed. Such data is then used for (a) evaluating the success or failure of the treatment design, (b) making recommendations about future treatments, (c) successfully operating the well, and (d) successfully engineering the surrounding reservoir. In addition, when combined with other data types, the data can be important in making decisions about drilling in new fields and the legal requirements for drilling in existing fields.

Because of the isolated and inaccessible nature of fracture formations, and the seeking of oil and gas at greater depths with the accompanying increased temperature levels and lower permeability, the need and difficulty of applying appropriate fracture treatments has increased significantly.

Fracture survey methods used in the past have included the sensing of fluid flow, radioactivity, temperature, pressure, including pulses, and resonance; and the seismic and acoustic sensing within a bore and on the surface of the ground adjacent to a bore of motion or microseismic activity or signals generated from sources outside of the fracture formation. Such methods have included analysis of the data by various methods and the use of theoretical computer models.

However, for various reasons, the past survey and analysis methods have not been reliable, resulting in the loss of product potential and the uneconomical use of fracturing resources. Among the reasons for the unreliability of past methods has been the migration of fluid in the well bore out of the region being sensed, resulting in inaccurate fluid property data. Other methods have assumed a single plane fracture, contrary to fact. Various methods have made incorrect assumptions in their analysis of the data received and hence have failed to obtain valid results. Thus, there has been an unfulfilled need for a reliable fracture survey and analysis method.

2. Description of the Related Art

Illustrative patents and publications description of the related art include the following.

The U.S. Pat. Nos. 2,951,535, 3,306,102, 3,332,483, 3,402,769, to Mihram et al. Lebourg, Wyllie, and Doggett et al. disclose the use of radioactive substances in fracturing fluids which are detected and logged in the bore hole in order to provide an indication of the location of a fracture.

The U.S. Pat. No. 3,205,941 to Walker discloses a logging tool in the well bore which generates and receives acoustic signals by reflection and refraction from discontinuities, including fractures.

The U.S. Pat. No. 4,057,780 to Shuck discloses detonating liquid explosives in fractures and monitoring the emissions with acoustic sensors at spaced locations above the well bore to determine the configuration and orientation of the fractures.

The U.S. Pat. No. 3,356,177 to Loren discloses transmitting acoustic impulses in a well in a manner to indicate acoustic wave interference and anomalies indicating fracture of the wall of the well.

The U.S. Pat. No. 4,310,346 to MacDonald and U.S. Pat. No. 4,328,567 to Dodge are further illustrative of patents disclosing the acoustical logging of a bore hole of a well.

The U.S. Pat. No. 3,427,652 to Seay discloses applying oscillating fluid pressure within a well zone subject to fracture and, following the application of such pressure, measuring the resonant frequency of the fluid oscillation, and repeating this procedure to obtain information respecting the fracture.

The U.S. Pat. No. 4,458,245 to Crosnier et al. discloses a sonde mechanism for pulsing fluid and sensing pressures and resonances in an isolated section of a well bore in order to determine fracture characteristics.

The U.S. Pat. No. 3,586,105 to Johnson discloses applying pulses of pressure within one well and sensing and analyzing the pressure changes in adjacent wells in order to determine vertical fracture orientation and other characteristics.

The U.S. Pat. No. 4,749,038 to Shelley discloses pumping fluid into a well, shutting in the well and monitoring the pressure in the well to determine the time required for predetermined change in pressure to occur in order to design a fracture treatment.

The U.S. Pat. No. 4,432,078 to Silverman discloses the generating of pressure pulses at the lower portion of a well and sensing these pulses in spaced relation around the top of the well on the surface in order to determine the azimuth of a fracture.

The U.S. Pat. No. 3,739,871 to Bailey discloses applying pressure in a well to cause fracturing, and sensing and recording the time of arrival of seismic waves on the surface of the earth at spaced locations around the well bore.

The U.S. Pat. No. 4,280,200 to Silverman discloses the creating of a seismic wave at the surface and over the supposed position of a fracture and detecting the seismic wave reflected upwardly at or near the fracture at each of a plurality of seismic sensors. The U.S. Pat. No. 4,524,434 to Silverman is of generally similar nature.

The U.S. Pat. No. 4,420,975 to Nagel et al. discloses the injecting of a fluid into a well bore that invades the earth formation and measuring or logging at different points in time a characteristic of the fluid such as resistivity or the decay time of thermal neutrons.

The U.S. Pat. No. 4,42,895 to Lagus et al. discloses applying fluid pressure within an isolated region of a bore hole isolated by packers and simultaneously monitoring pressure and flow in the region and adjacent regions in order to determine fracture characteristics.

The U.S. Pat. No. 4,109,717 to Cooke discloses the use of a rotatable temperature probe in a well for the purpose of sensing the relatively cool liquid in a fracture in order to determine the orientation of such fractures.

Analysis of the pressure decline following fracturing and while the well is shut-in, for the purpose of determining the volume of fracturing fluid required for extending a fracture, is described in the U.S. Pat. No. 4,398,416 to Nolte.

The U.S. Pat. No. 4,440,020 to Boutemy et al. discloses the making of a plurality of well logs at common depth intervals to find consistency between the logs in order to provide an indication of the geologic formation.

The U.S. Pat. No. 4,638,254 to Uhri discloses the analysis of data obtained from orientation logging in which unit vectors are employed to produce a resultant vector for indicating the orientation of the formation under study.

The 1986 publication SPE 15216 entitled "Advances in the Microseismic Method of Hydraulic Fracture Azmith Estimation" by Sorrells and Mulcahy discloses the monitoring from a nearby well by seismic sensors, pressure gauges, temperature probes and acoustic sensors for detecting high frequency pressure deviations, in order to determine the azimuth of a hydraulic fracture.

Prior to making the present invention, I was aware of the commercial employment of a sonde for sensing motion in a well immediately after a fluid pressurization phase for the purpose of determining the azimuth or direction of the hydraulic fracture. This was performed at several levels in order to reduce the possibility of error due to the effect of sonde deployment. However, the number of such levels was not related to the height of the fracture, nor for the purpose of determining it and, in fact, was insufficient for such purpose.

Furthermore, in 1986, I participated in an experiment seeking to determine the overall dimensions of a hydraulic fracture by detecting in a well bore an artificial wave energy source such as a mechanical, controlled-frequency band sweep device, a weight drop, an explosive, or a land air gun, applied at the earth's surface. The sonde detector was employed at different depths and its data was analyzed by me, for resonance and to compare the combined horizontal and vertical components of motion, in an attempt to indicate the fracture dimensions. This was unsuccessful.

I am aware of earlier patents such as the U.S. Pat. No. 1,909,205, to McCollum dated May 16, 1933, which describes the use of a seismic detector in a well bore at a plurality of locations for the purpose of analyzing the travel time of direct and reflected energy from a buried explosive charge or a dropped weight on the earth's surface. This is for the purpose of identifying and delineating pre-existing geological structures, whereas the present invention is concerned with determining the dimensions of a man-made hydraulic fracture.

SUMMARY OF THE INVENTION

It is an object of the invention to provide a procedure for economically determing the height and depth of a hydraulic fracture.

A further object is to provide a method for determining the height and depth of hydraulic fractures including at depths of two miles or more, based on in situ passive (treatment induced) seismic monitoring data.

A further object is to provide a method of determining the height and depth of hydraulic fractures from treatment induced seismic monitoring data obtained directly from the treated well, without requiring data observation from another well.

A still further object is to provide a method of determining the height and depth of hydraulic fractures from treatment induced seismic monitoring data obtained from the treated well in a time frame selectable by the operator either immediately following the treatment or thereafter, in order to avoid the creation of unnecessary expense.

A still further object is to provide a method of determining the height and depth of hydraulic fractures from passive seismic monitoring data received only from conventional fracturing techniques and which uses only standard equipment and technology for data acquisition, and in which the data is received at a selected above ground acquisition station.

In carrying out the invention, a sonde is employed which has a 3-component motion sensor which is pressed against the wall of the well to create a coupling between the sensor and the surrounding well structure. The sonde is connected electrically and mechanically to a data acquisition station on the surface. Wave motion data is preferably sensed and recorded at a series of locations exceeding the projected vertical extent of the hydraulic fracturing prior to the fracture treatment in order to obtain a base line corresponding to the unfractured state. After the fracturing pumping has ceased, the well is shut-in and during a period of instability, data is recorded at the same locations as previously.

The data is analyzed by identifying and separating out discrete motion and parameterizing a single ratio of the combined horizontal to vertical components of the induced background wave motion at each recording depth. Such ratios provide an indication at each depth of the presence or absence of fracturing at such depth, thereby indicating the vertical extent of the fracturing.

BRIEF DESCRIPTION OF THE DRAWINGS

FIG. 2 is a schematic horizontal section through a well in a typical fracture zone;

FIG. 3 is a plot of fluid pressure versus time during a fracture treatment and immediately following;

FIGS. 21a, 21b, 21c is a graph of the average H/Z at each recording depth, before and after mini-frac and massive fracturing respectively.

DESCRIPTION OF THE PREFERRED EMBODIMENT

Figure 1:
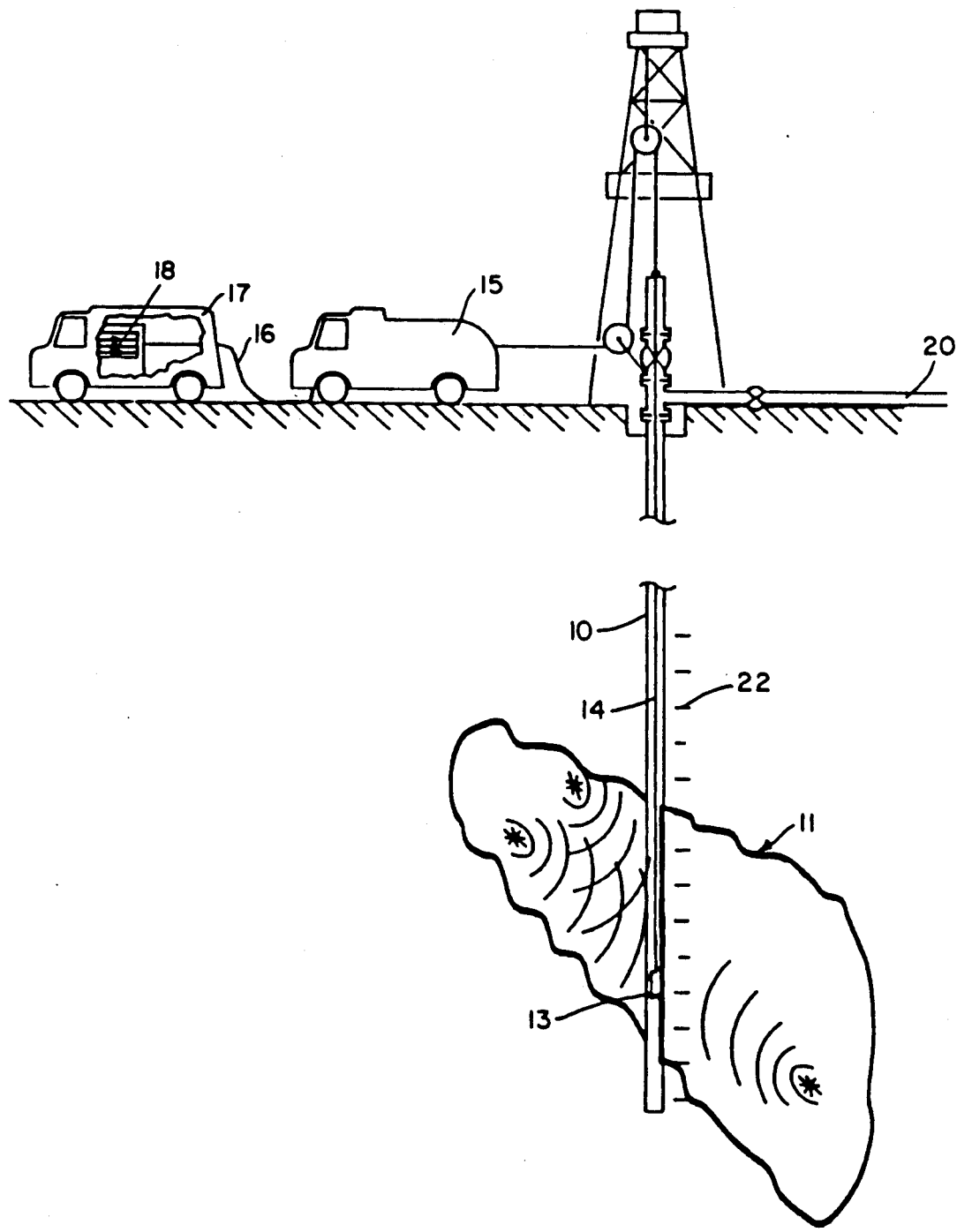
FIG. 1 is a general schematic representation of a well bore and equipment employed in practicing the present method.

With further reference to the drawings, especially FIG. 1, a well is indicated having a casing 10 and extending downwardly through a fracture zone 11. While the invention may be practiced in an uncased well, it is contemplated that a casing will ordinarily be used. The well may be of any desired depth, the invention not being limited with respect thereto, but on the other hand, being usable at depths of, for example, two miles or more. Furthermore, while wells are conventionally vertical, the invention is not limited to use with vertical wells. Thus, the terms "vertical" and "horizontal" are used in a general sense in their reference to wells.

A sonde device 13 of conventional structure, having a 3-component motion sensor (two horizontal and one vertical axis) is extended into the well by a cable 14 which includes both mechanical linkage for raising and lowering the sonde and electrical linkage for telemetering instructions to the sonde and telemetering data away from the sonde. The cable 14 is reeled through suitable means to a wire line truck 15, having an electrical connection 16 to a data acquisition truck 17 within which data recording means 18 is placed.

A fluid pipeline 20 is connected by suitable means to the top of the well casing and to pumps, not shown, for the purpose of pumping appropriate fluid into the well from a source, not shown.

In practice, the sonde is lowered to appropriate predetermined locations or stations 22 in the well and has means for pressing itself against the side of the well in order to be able to sense the motion of the well casing. The sonde also senses motion of the fluid, itself, which is in contact with it.

In practice, the engineers, working with information available, and as directed, reach a determination of the general level at which the fracture will be made and whether to employ a mini-fracture or a massive fracture treatment. Such treatments are well known in the art and are described in the patents and literature identified above.

Data Acquisition

Data acquisition in the depth zone of the intended fracture preferably begins prior to the fracture treatment. During this pre-treatment phase, wave motion data is recorded at a series of locations or stations exceeding the anticipated or design vertical extent of the hydraulic fracture. At each station 22, the wave motion is recorded prior to the treatment to determine a reference or base line corresponding to the unfractured state. Depending on various factors such as the anticipated vertical extent of the fracture, the stations may be anywhere from about 10-100 feet apart and ordinarily would number approximately fifteen or twenty. This pre-treatment procedure is not for the purpose of determining fracture data but for comparison with the fracture data subsequently obtained to confirm proper sonde operation and data acquisition.

After recording the data from the pre-treatment stage, the sonde is either lowered to a depth below the targeted treatment level or is completely removed from the well. The sonde is lowered in order that it will not obstruct the treatment if subsequent data is to be recorded immediately either during shut-in hiatuses in the treatment or during shut-in immediately after treatment completion. The term "shut-in" refers to that phase of the procedure when fluid injection by pumping stops and the top of the well is closed or sealed off without bleeding out any injected fluid at the surface. As a result, high pressures within the well and the fracturing zone are maintained and slowly decrease as the treatment fluid diffuses through the formation. The above referenced U.S. Pat. No. 4,398,416 to Nolte describes the pressure decline.

If the subsequent data is to be recorded sometime after a treatment has been completed, then the sonde is removed and redeployed at such later time.

In either case, wave motion data is not recorded during the active treatment procedure since the treatment activities at the surface create spurious wave motion. Data is, however, recorded during a shut-in period as described above while there is instability in the formation due to the preceding treatment. This treatment may be either a first treatment to cause a fracture, or a subsequent treatment to enlarge a previous fracture.

In further preparation for the fracturing treatment, the casing of the well is perforated in the zone of the anticipated treatment by means well known in the art. At any desired time thereafter, selected fluid of appropriate nature and amount is pumped into the well at an appropriate rate to create or enlarge a previous fracture. It is believed that at depths below 1000 to 2000 feet, most fractures are oriented vertically (see Part I, "Overview of Current Hydraulic Fracturing Design and Treatment Technology", page 684, referenced above). The section of FIG. 2 illustrates what may be a typical configuration with a principal plane and deviations according to the stress orientation.

During the fracturing treatment, the pressure is increased to the breakdown pressure of the rock.

A typical pressure verses time curve is illustrated in FIG. 3. The breakdown pressure point is that pressure at which the fracture occurs, the pressure immediately dropping off to a lower pumping pressure. When the pumping has ceased and the well is sealed off, as indicated at the shut-off point on the graph, then, after an initial drop, the pressure gradually declines generally along a plateau indicated as the instantaneous shut-in pressure.

During such gradual decline, there is a period of instability during which data from various stations 22 is received. It is believed that the fracture slowly closes down as fluid is leaked off into the formation. During this time, the sonde measures the movement of the casing and the movement of the fluid within the treated well. The casing moves as a result of ground motion surrounding the casing and as a result of fluid movement on the side of the casing as well as movement of the fluid within the casing. At each of the stations 22, data is typically recorded for approximately three to five minutes.

Figure 5:
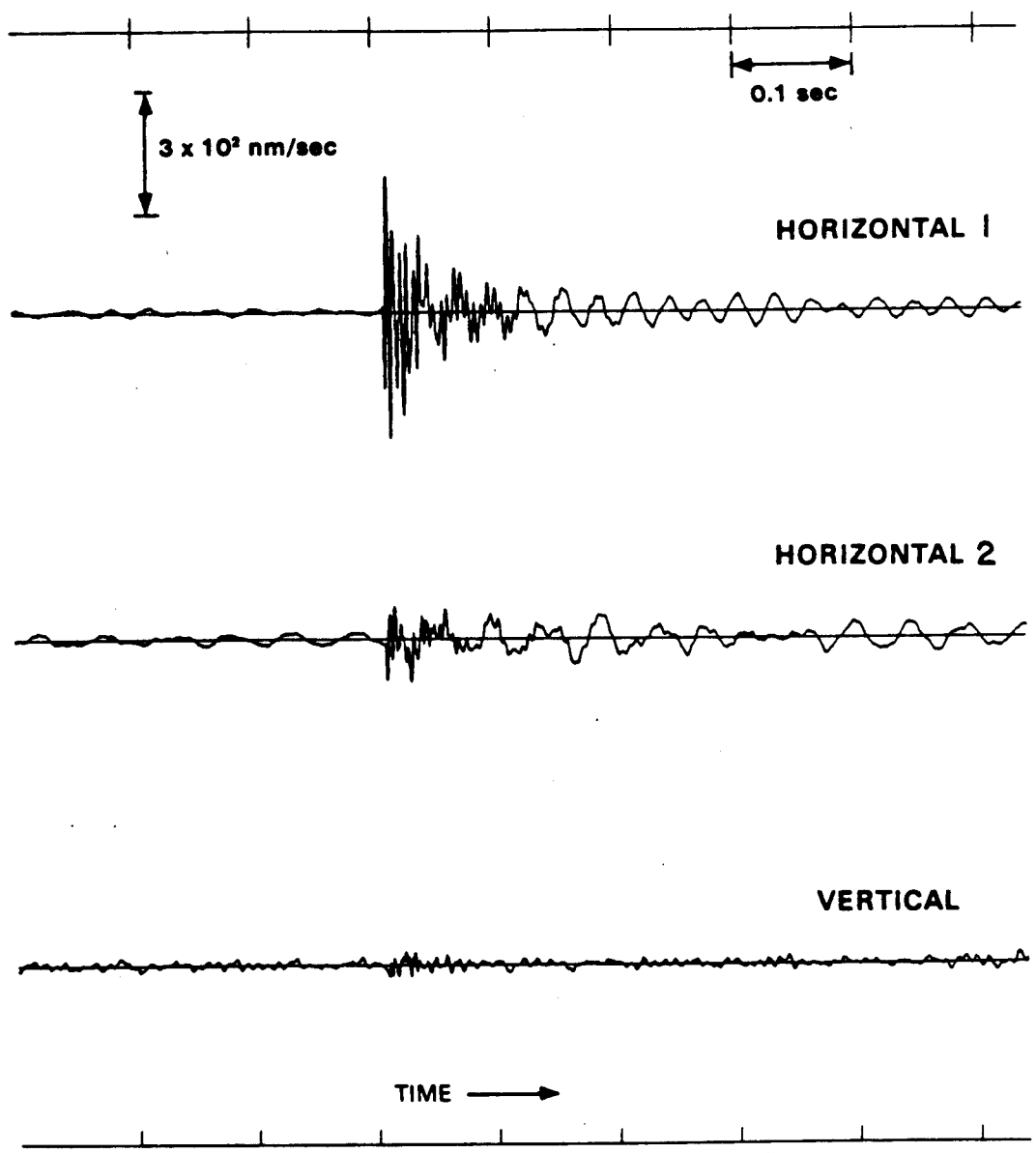
FIG. 5 is an analog plot of data taken during a selected time segment at a selected upper depth.

A sampling of typical recorded data for a brief interval at one of the stations is indicated at FIG. 5. Thus, the lines designated "Horizontal 1" and "Horizontal 2" represent movement in the direction of the two horizontal axes, and the line designated "Vertical" represents movement in the direction of the vertical axis. It is the data of FIG. 5 that is analyzed for the purposes of the present invention.

The Components of the Recorded Data

The motion data recorded within the treated well is composed of three parts. First is the noise or motion from sources not attributable to nor affected by the fracture treatment or subsequent pressurization. Second are the discrete signals or energy arrivals caused by the treatment or the pressurization. Third is the continuous background motion which is due to the treatment or pressurization, but which cannot be identified as specific signals or arrivals. This background motion is the increased or enhanced level of motion compared to the pre-treatment or pre-pressurization level of motion and whose quantification is the basis for the ultimate determination herein.

Description of the Analysis Method

The analysis method used here to determine depth and height of the fracturing has five essential parts. First is the identification and explicit removal of as much of the noise within the data as possible. Second is the removal of the identifiable discrete signals. The order of these steps is not important; however, they must be done before the subsequent analysis of the continuous background motion can be performed.

The third step is the partitioning of the remaining motion data (continuous background motion) into its two principal direction components, the horizontal component and the vertical component. (If a three-component sonde which records two horizontal and one vertical component of motion has been used in a vertical well, the horizontal component described here is the vector sum of the two recorded horizontal components of recorded motion.)

Fourth is the calculation of a parameter at each depth which specifies the dominance of one of these principal components of motion over the other component. The dominance parameter which has been found effective for this purpose is the average ratio of the RMS (root-mean-square) (to be explained) horizontal motion component to the RMS vertical motion component denoted H/Z.

The final or fifth step is the comparison of H/Z at each of the recording depths. The basis for the comparison is the categorization of H/Z into two groups: (1) H greater than Z and (2) H less than Z. Based on this categorization of H/Z, the line of recording locations intrinsically subdivides into two types of contiguous groups. The location of these groups within the well delineate the depth and height of the fractured zone. The group of recording depths with H greater than Z are within the fractured zone. The group of recording depths with H less than Z are outside of the fractured zone.

An Example of Data Processing and Analysis

Figure 4:
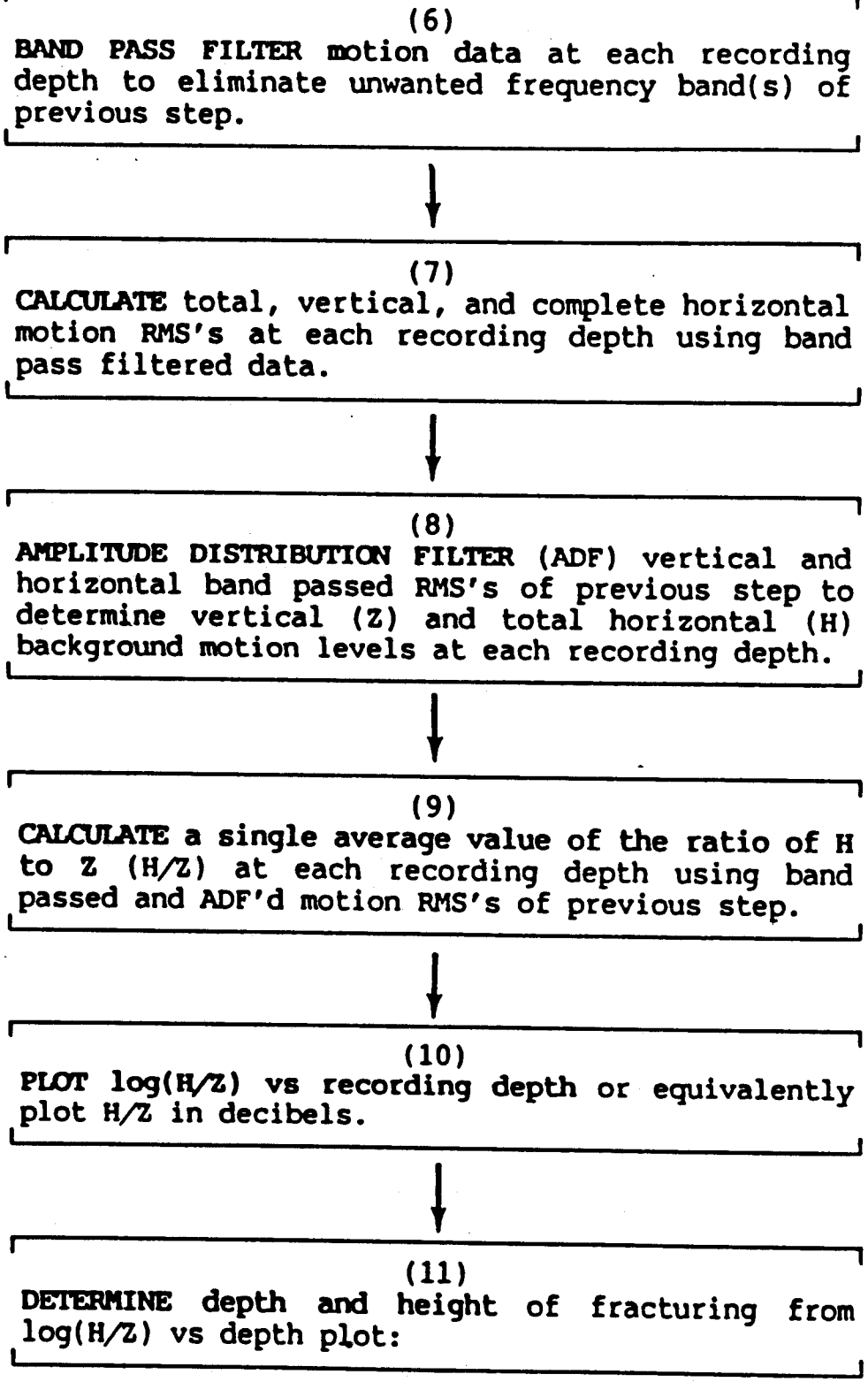
FIG. 4 is a block diagram indicating the steps in data acquisition and analysis.

FIG. 4 is a block diagram describing the steps performed to complete the data analysis.

Following is an illustrative example of the data analysis method. Ths example shows specific methods and procedures by which the five general steps described above are accomplished. The values chosen for various parameters and the use or non-use of various filters (to be explained) to process these data are dictated by both previous experience and particular characteristics of these data. These parameters and filters may vary for other data sets; however, the procedures remain the same.

Description of the Recorded Data

The data used in this example, with the exception of data shown in FIG. 21, is a subset of the complete data set recorded at an experimental well site. These data were recorded at two different recording depths, 9460 ft. and 9910 ft. below the surface. The two data sets were taken at different times during the mini-frac shut-in (i.e. the time immediately following the cessation of the treatment pumping when the well is maintained at high pressure). The data at depth 9910 were recorded approximately 1 hour into the shut-in period. The data at 9460 were recorded more than 2 hours into the shut-in. The data from these depths were chosen for this illustration because they exemplify the change in the dominant motion direction since depth 9460 was above the fracture and depth 9910 was within the fracture zone.

The data used for this example are recordings of approximately 5 minutes of motion sensing at each of the depths. These data were recorded digitally at the surface from continuous transmission of the analog recording of the three orthogonal motion components of the recording sonde, two horizontal and one vertical. The surface digitizing was performed at a rate of 2000 samples per second per component. These three components of the motion represent a complete description of the motion of the sonde within the treated well for frequencies less than 1000 Hz. The data sensors used within the sonde are geophones which record distance per time unit, or velocity, and, hence, data will be presented in units of velocity, specifically, nanometers/second (nm/sec). (one nanometer = $10^{-9}$ meters).

Selection of Background Motion Time Segments

FIGS. 5–8 show analog examples of 0.8 second segments of the three five minute digitally recorded components, the two horizontal and the vertical, of recorded motion as a function of time. The amplitude (Y-axis) scale and time (X-axis) scale are indicated in each figure. Note that the amplitude scales of each component within a figure are the same, but the amplitude scales of different figures are not the same; the time scale in each figure is the same. Such scales are selected to facilitate comparison and visual presentation.

Figure 6:
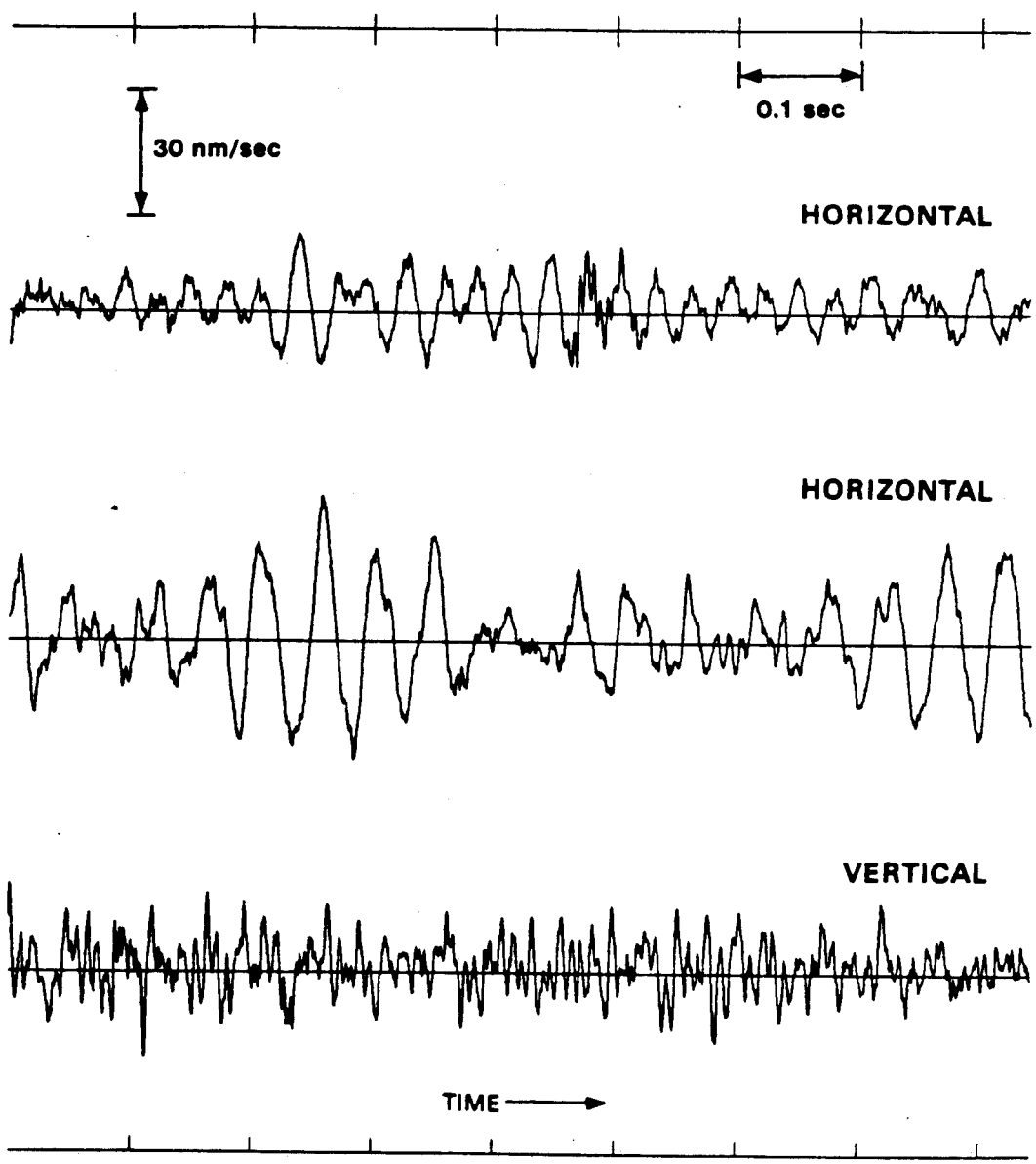
FIG. 6 is an analog plot of data taken during a different time segment at the same depth as FIG. 5, and employing a different amplitude scale.
Figure 7:
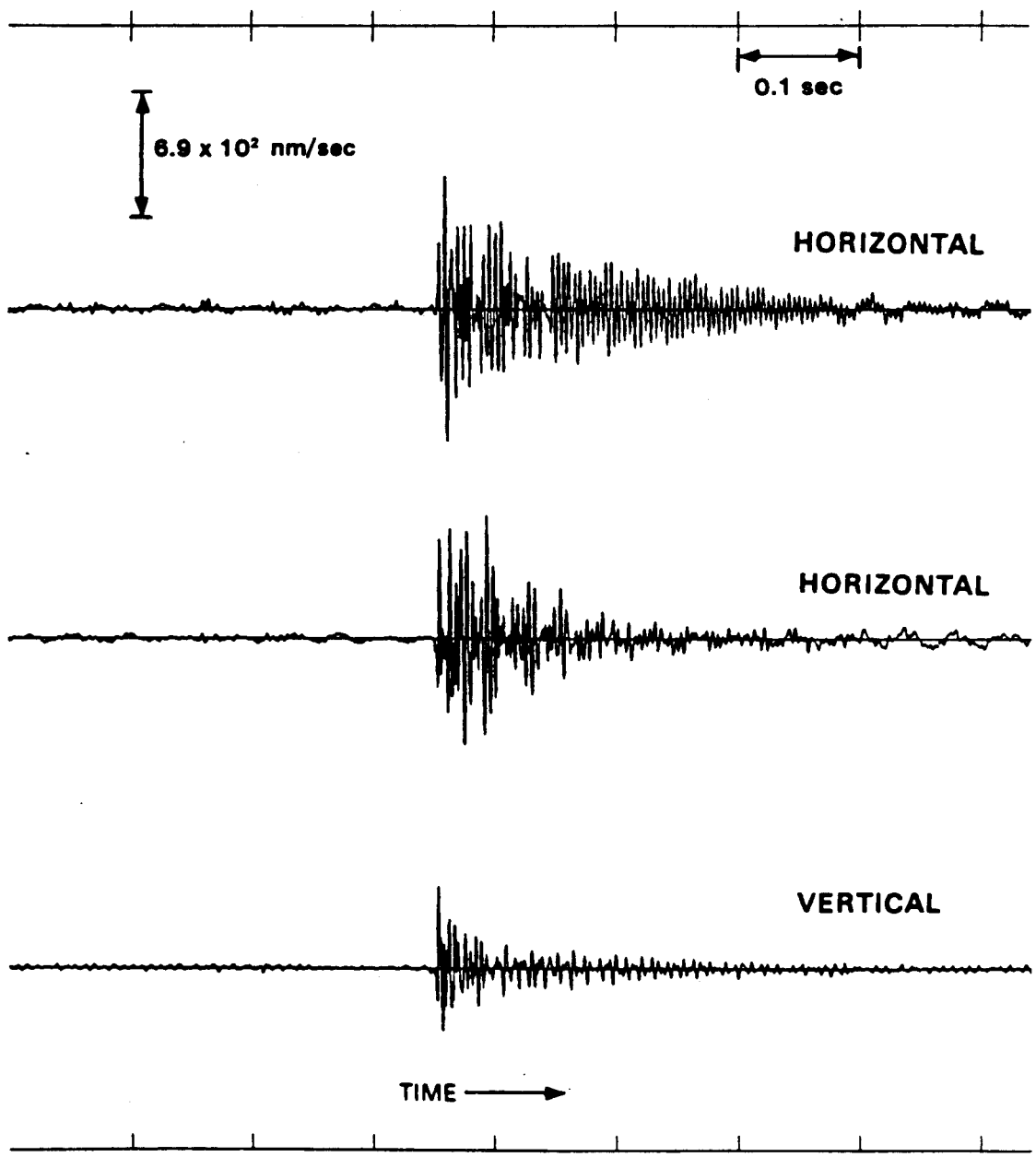
FIGS. 7 and 8 are data taken similarly to FIGS. 5 and 6, but at a lower depth.
Figure 8:
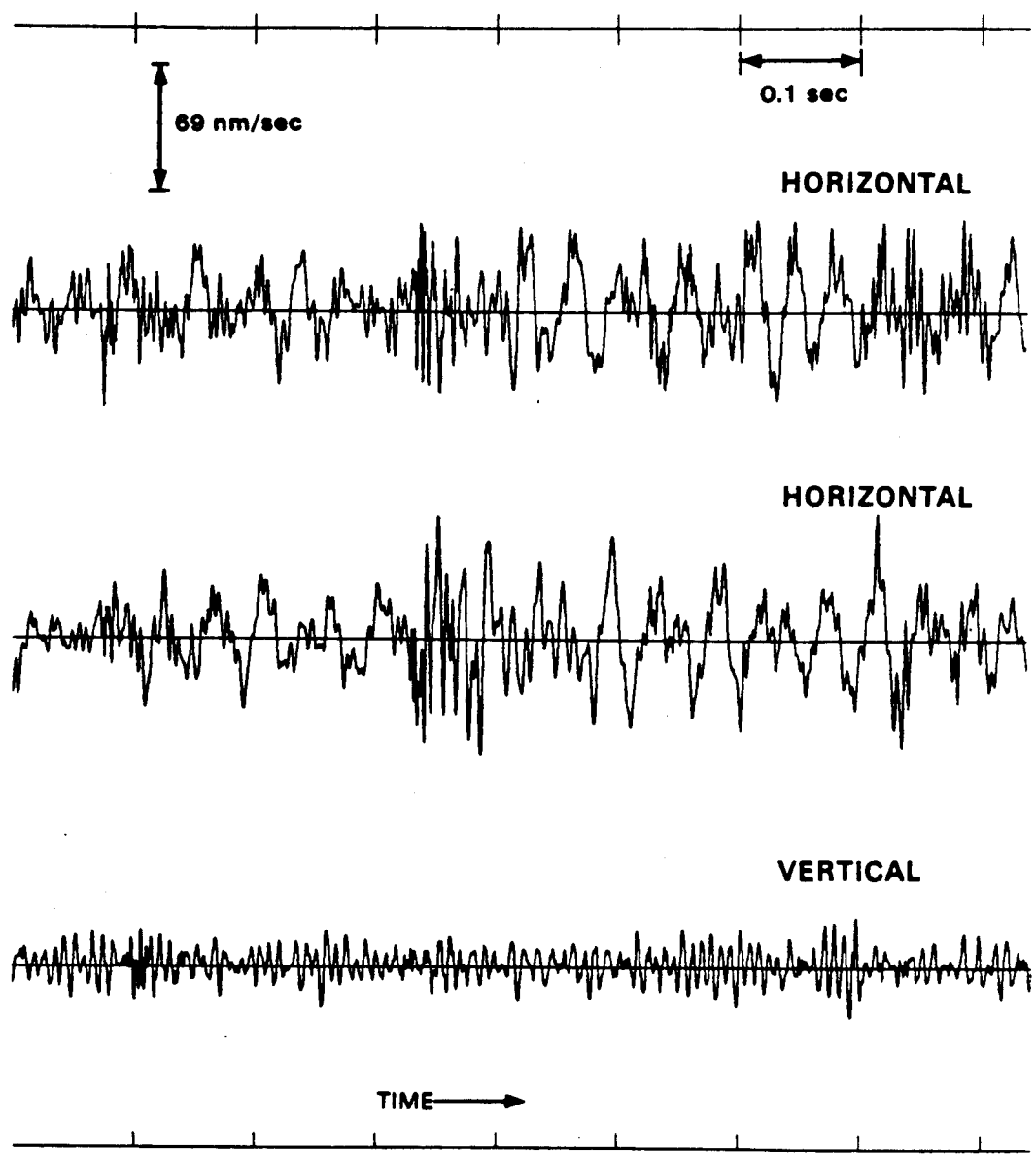

FIGS. 5 and 7 show examples of predominantly identifiable or discrete signals. FIGS. 6 and 8 show examples of predominantly background motion. A comparison of FIGS. 5 and 7 to FIGS. 6 and 8, respectively, shows that the signals are easily distinguished from the background motion. Within the data, signals have impulsive initiations and can vary in amplitude from 10 to $10^4$ times greater than the background motion. Although not shown in these figures, the background motion created by the pressurization is typically 10 to $10^2$ times greater than the pre-treatment noise.

Calculation and Plotting of Total RMS

In order to compress the vast amount of recorded data into a manageable format for subsequent analysis, the total motion RMS (root-mean-square) versus recording time is calculated for each recording depth. The total motion is the vector sum of the three recorded components of motion. The RMS of the total motion is found by (1) summing the square of individual (digital) data points within a specific time range or window, (2) dividing the total by the number of data points comprising the sum, and (3) taking the square root of this value. The resulting number is retained and the operation is performed on the adjacent time window of data. This is repeated until the entire data set is processed. Because of the routine nature of these calculations, the total motion and the RMS values are calculated by a computer program. The calculation of the RMS is a standard mathematical method. The RMS method is one of a number of possible data compressing methods and is used here for convenience.

The RMS calculation in this example used a time window of 0.1 seconds or, equivalently, 200 adjacent data points to calculate one RMS value. For five minutes of recorded data this meant 3000 RMS values of the total motion were calculated from the original 1,800,000 recorded data values. (1,800,000 = 2000 sample/seconds × 60 seconds/minutes × 5 minutes of recorded motion data × 3 components of recorded motion data).

The first two minutes of the total motion RMS versus time for the 9460 ft. and 9910 ft. recording depths are shown in FIGS. and 9 and 10, respectively. Because of the large variation in the amplitude of the RMS values, the Y-axis in FIGS. 9 and 10 and subsequent RMS plots are scaled in decibels (dB). (One decibel, here, equals ten times the common logarithm (i.e. base 10) of the square of the RMS value.) Note, within FIGS. 9 and 10 the noise level covers approximately a 10 dB band.

For convenience, in subsequent RMS plots only the first 2 minutes of the original 5 minutes of recorded data will be shown. This represents no loss since the 2 minutes of data are illustrative of any point under consideration.

Figure 9:
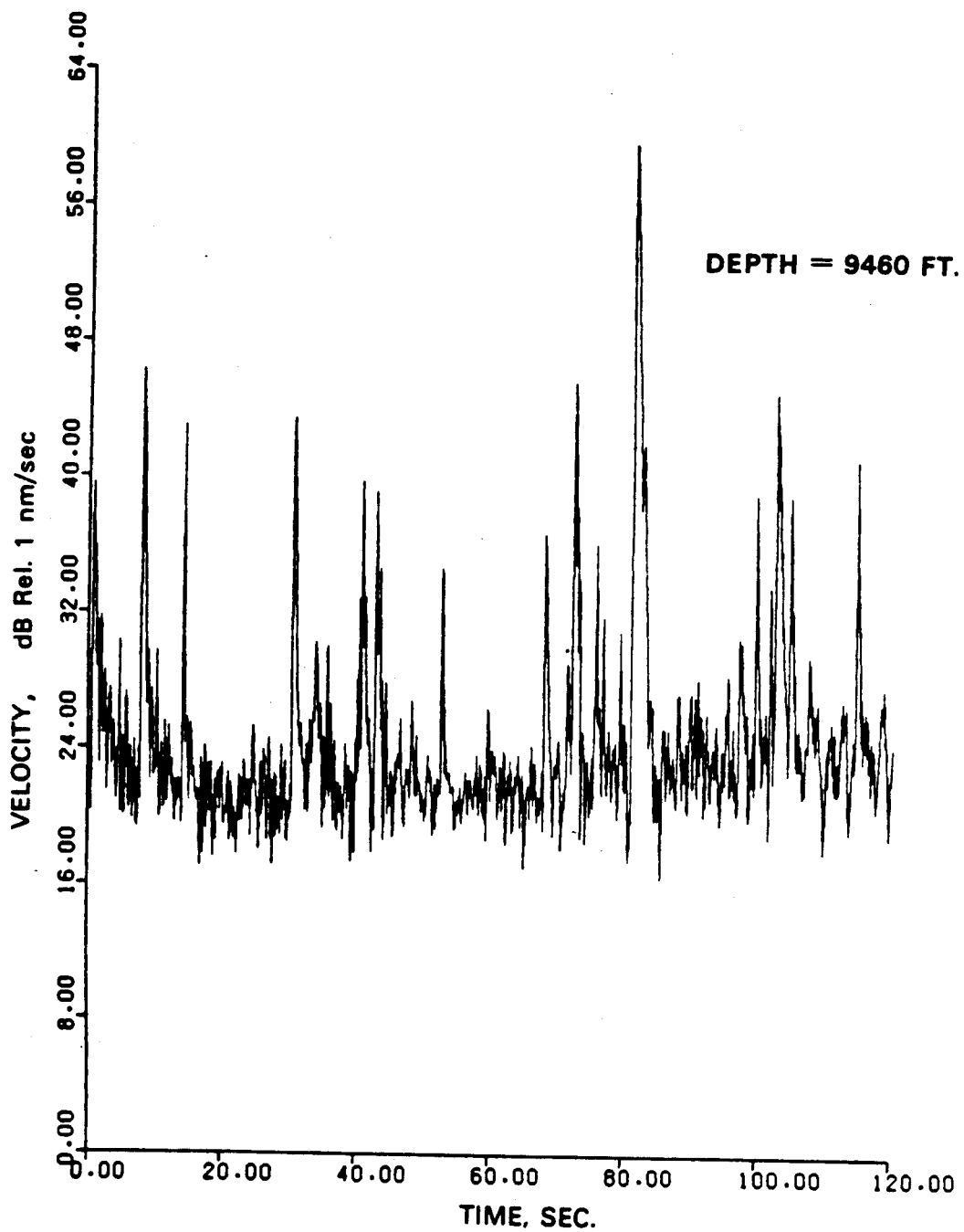
FIGS. 9 and 10 are plots of root-mean-square (RMS) values of the data taken during a two minute time frame using time windows of 0.1 second, at upper and lower depths corresponding to the above.
Figure 10:
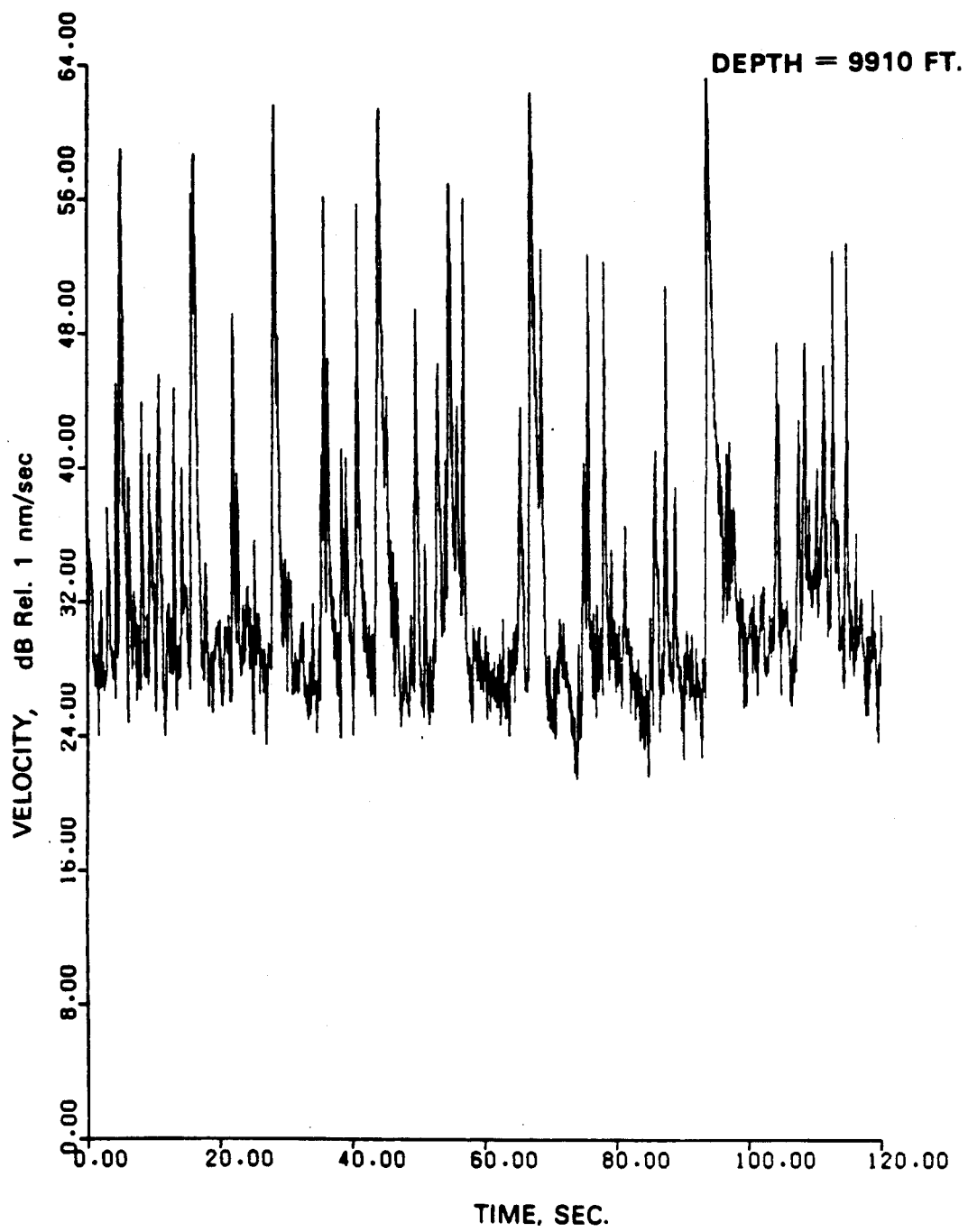

The "spikes" in FIGS. 9 and 10 represent individual signals with the larger spikes corresponding to larger amplitude signals. FIGS. 9 and 10 illustrate time periods when large discrete signals have arrived and periods when only small or no signals have arrived. By ignoring the large spikes in these figures one can loosely define a baseline level. The baseline level in these plots defines the RMS background motion leve with reference to which the signals rise and fall.

Using FIGS. 9 and 10, time periods or segments when only small signals or no signals have arrived can be seen. Conversely, the time segments of the data containing the discrete signals can be avoided. The data recorded during time periods of lowest activity (i.e. least discrete signals) were then used, as will be described, to calculate the frequency content of the combined background motion and the noise in an attempt to identify those frequencies having noise.

Cacluation and Plotting of Power Spectrum

The frequency content of the combined background and noise data was found by performing a Fourier transform on the recorded motion data during such lowest activity periods. From this transform a power spectrum of the data was calculated. This procedure is done by a computer program. It is performed on the original total motion data, not the RMS data, and on the individual horizontal and vertical components of the total motion. The complete horizontal motion power spectrum is then found by vectorially summing the individual power spectra of the two horizontal motion components.

(Note: In the remaining text of this example the term "horizontal" means the complete or vectorial sum of the two recorded horizontal components of motion, abbreviated as "H". Similarly, the vertical component of motion will be abbreviated by the letter "Z".)

Figure 11:
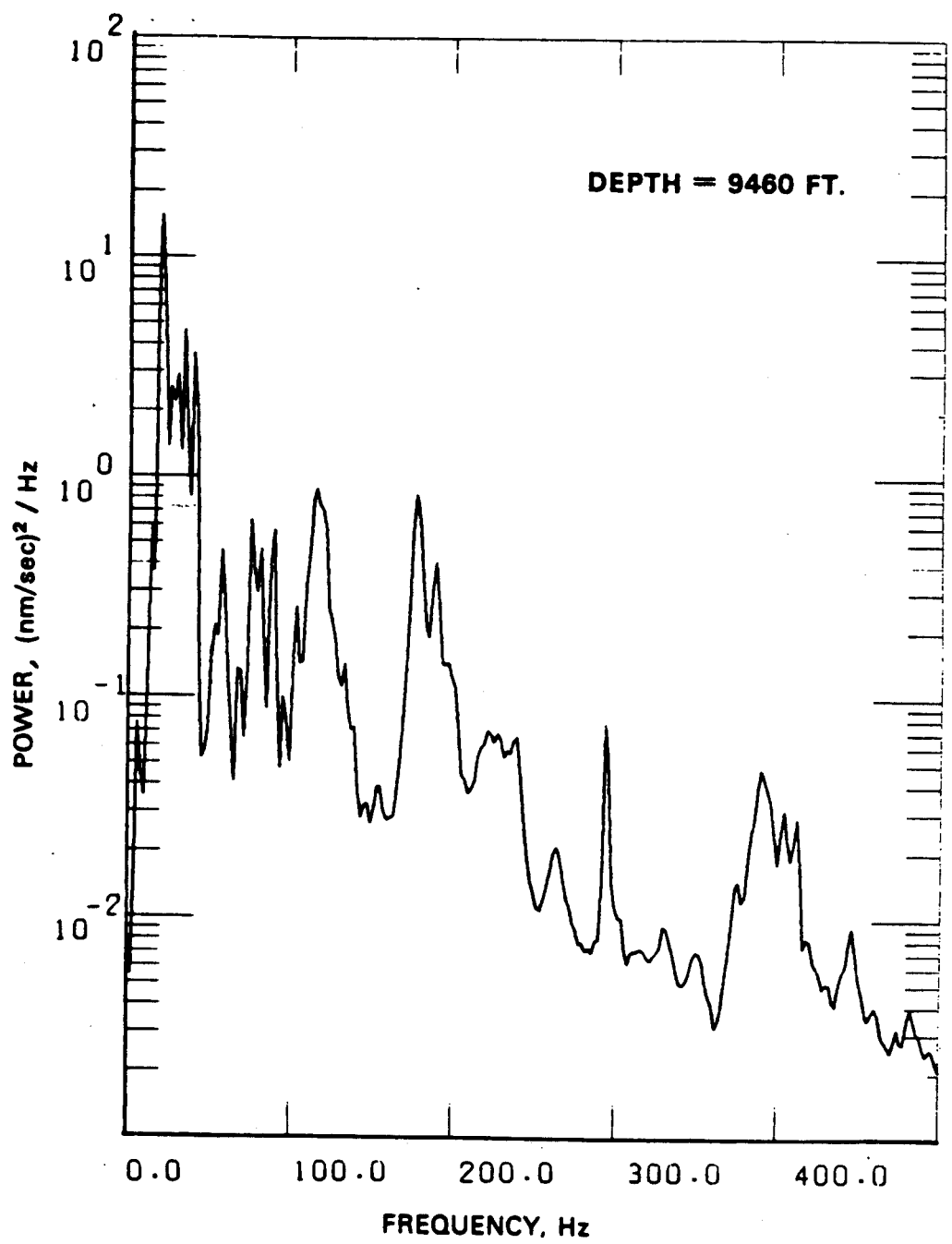
FIGS. 11 and 12 are plots of the total motion power spectra of the data during the two minute time frame at the upper and lower depths.
Figure 12:
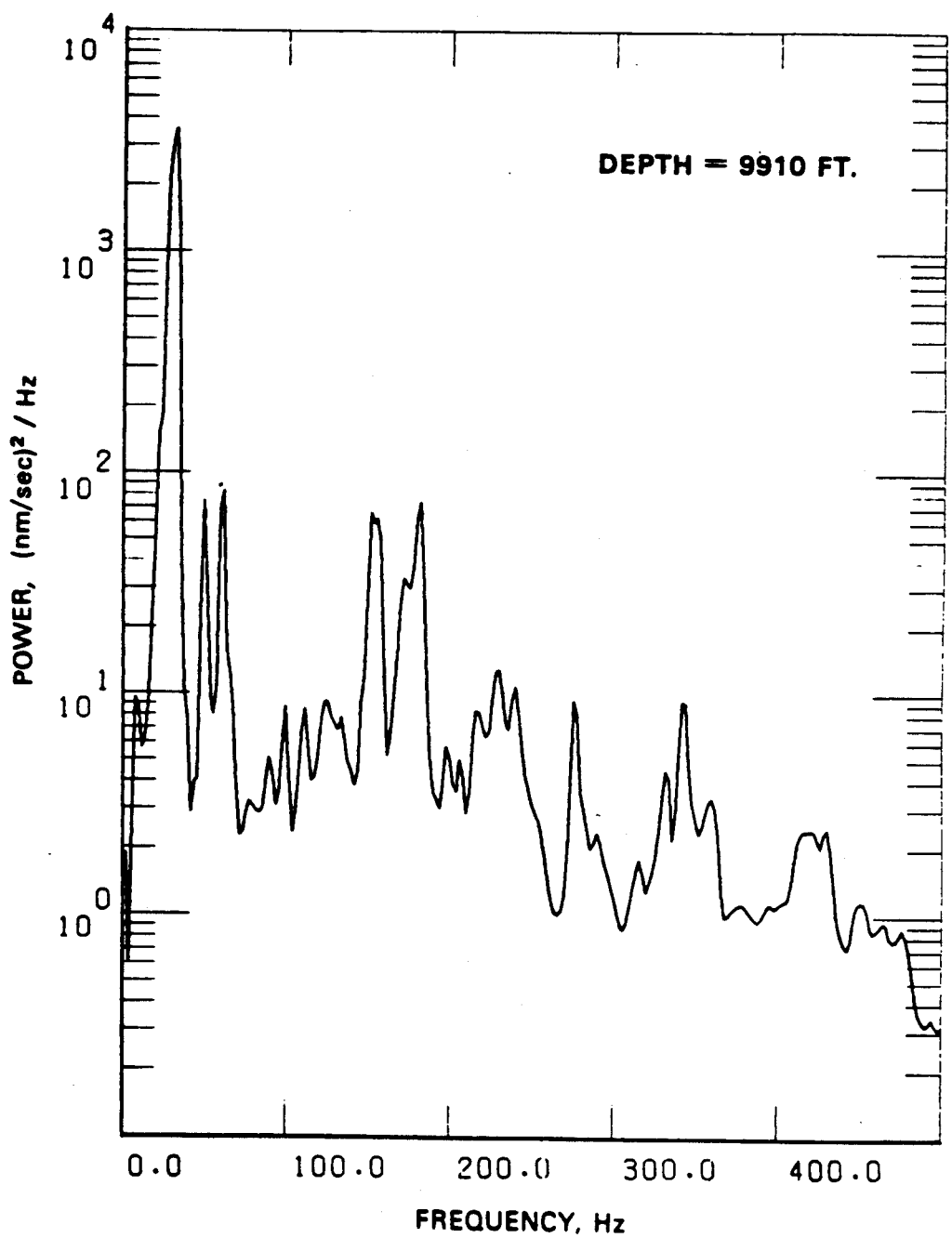
Figure 13:
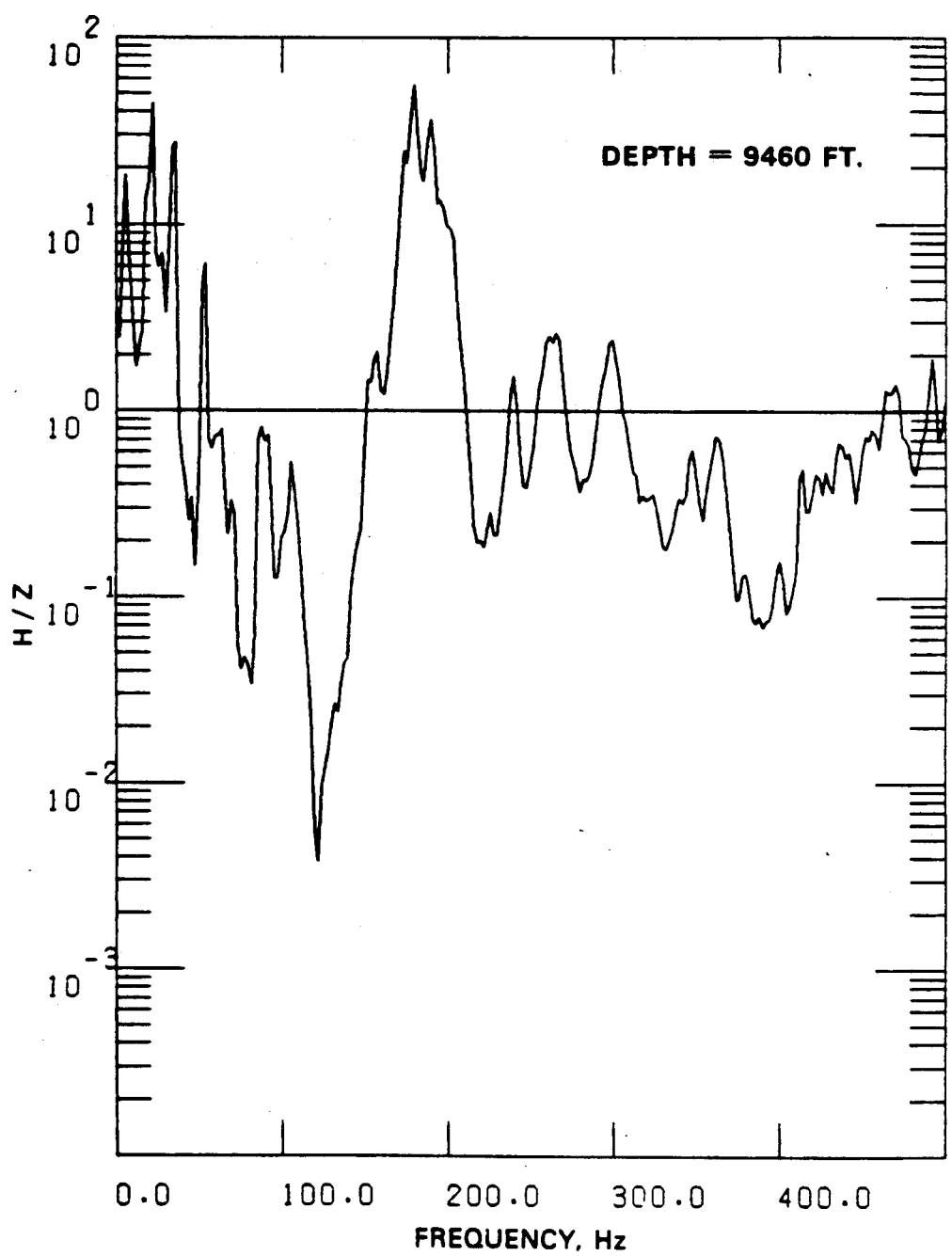
FIGS. 13 and 14 are plots of the spectral ratio of horizontal to vertical motion (H/Z) against frequency at the upper and lower levels.
Figure 14:
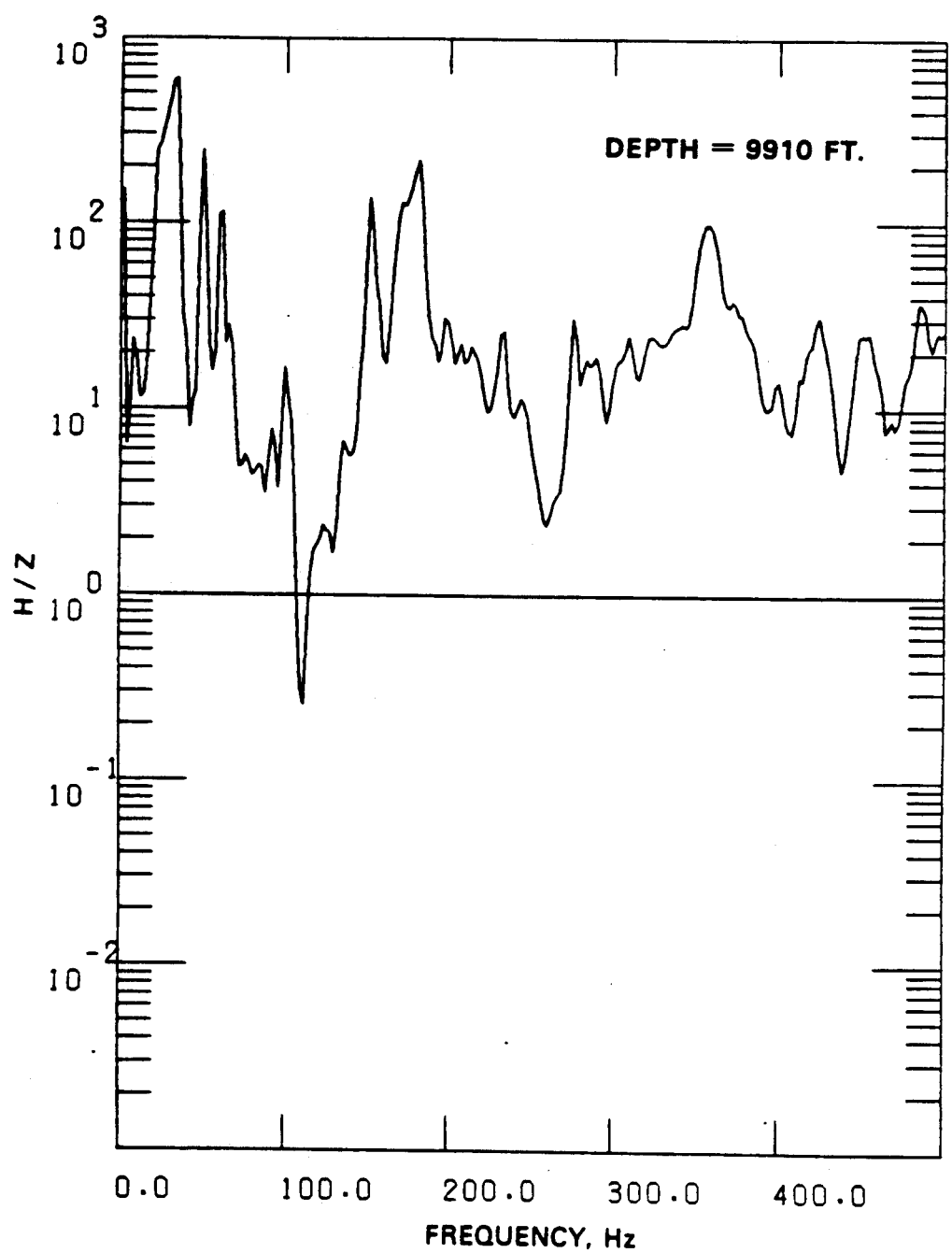

FIGS. 11 and 12 show the total motion power spectra at the depths 9460 ft. and 9910 ft., respectively. FIGS. 13 and 14 show the ratio of the spectrum or spectral ratio of the horizontal motion (H) to the vertical motion (Z) at the 9460 and 9910 ft. depths, respectively. FIGS. 13 and 14 were obtained by dividing the specific values of the horizontal motion power spectrum by the corresponding values of the vertical spectrum.

Determination and Plotting of Band Passed Data

FIGS. 11 through 14 were used to decide which frequencies were strongly contaminated with noise and, hence, were to be removed or filtered out. Based on previous experience and these figures, it was decided that for this data frequencies below 75 Hertz (Hz) were strongly noise contaminated and should be removed prior to subsequent processing. In other words, frequencies below 75 Hertz would be filtered out of the original recorded data. Only data with frequencies above 75 Hertz would be used in the remaining data processing. Referring to box 6 of FIG. 4, this operation represents "band pass filtering" the original motion data using a 75 Hertz high pass filter. The same band pass filter was applied to the data recorded at each depth.

Calculation and Plotting of Total Motion Band Passed RMS

Figure 15:
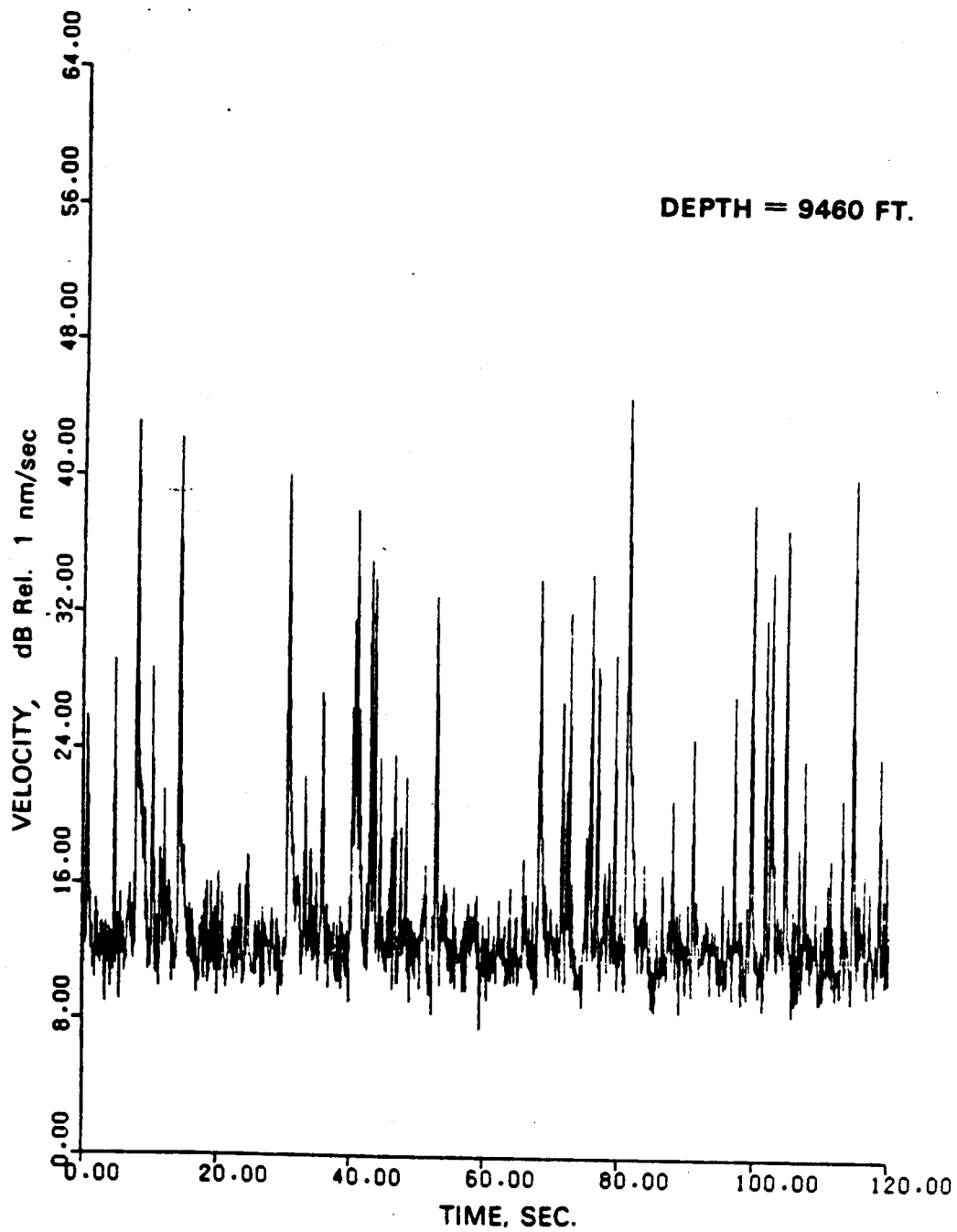
FIGS. 15 and 16 are plots similar to FIGS. 9 and 10 from which data with frequencies below a predetermined level (75 Hz) has been filtered.
Figure 16:
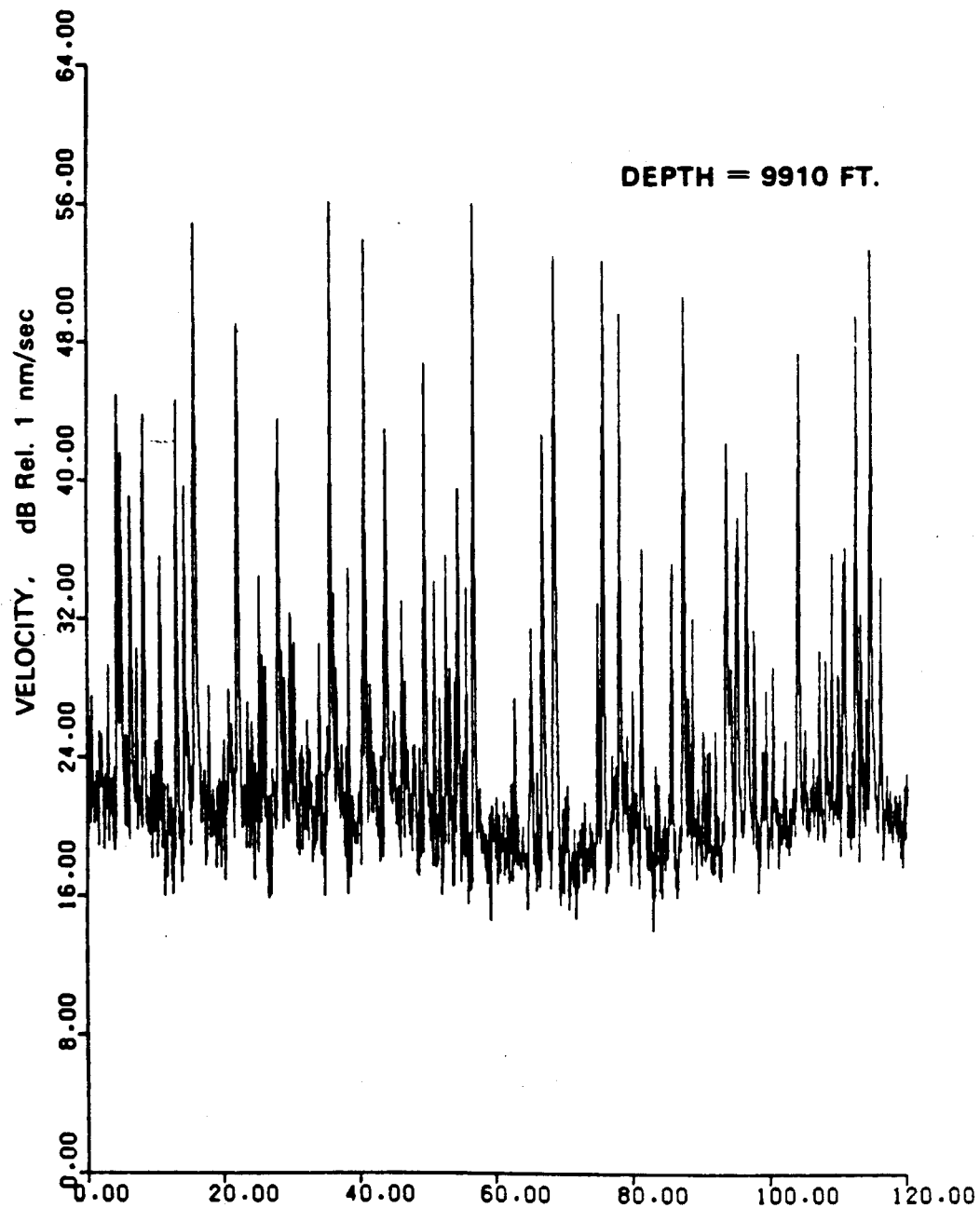

Using only the high pass filtered data, another set of RMS values of the total motion, the horizontal motion, and the vertical motion were calculated. FIGS. 15 and 16 show the band pass filtered RMS total motion versus time at the 9460 ft. and 9910 ft. depths, respectively.

Determination of Amplitude Distribution Filter (ADF)

The next step of the processing is the determination of a background RMS total motion level which is not influenced by noise and discrete events. The previous step removed the dominant noise components. The influence of the discrete signals is removed by the implementation of an amplitude distribution filter or ADF. An ADF is a filter designed to identify and eliminate the "spikes" from the total motion RMS data. The motivation for creating such a filter is for an unbiased determination of the background RMS amplitude level now that dominant noise contribution has been removed. Because the spikiness of the data at each recorded depth is different, an ADF tailored to each depth is built.

The ADF at a particular recording depth is computed by finding the largest and smallest values of the total motion RMS at that depth and then determining the population distribution of the data values between those limits. From the RMS data (FIGS. 15 and 16, for example) it is realized that the large identifiable signals do not represent the most common data values. By identifying the most common values of the RMS population distribution, retaining these values, and ignoring the remaining population, the discrete signals are filtered out and the band passed RMS background level with signals removed is determined. This is accomplished by the ADF. The operations of the ADF are performed by the computer.

Application of ADF to Band Passed Data and Plotting Remainder

Figure 17:
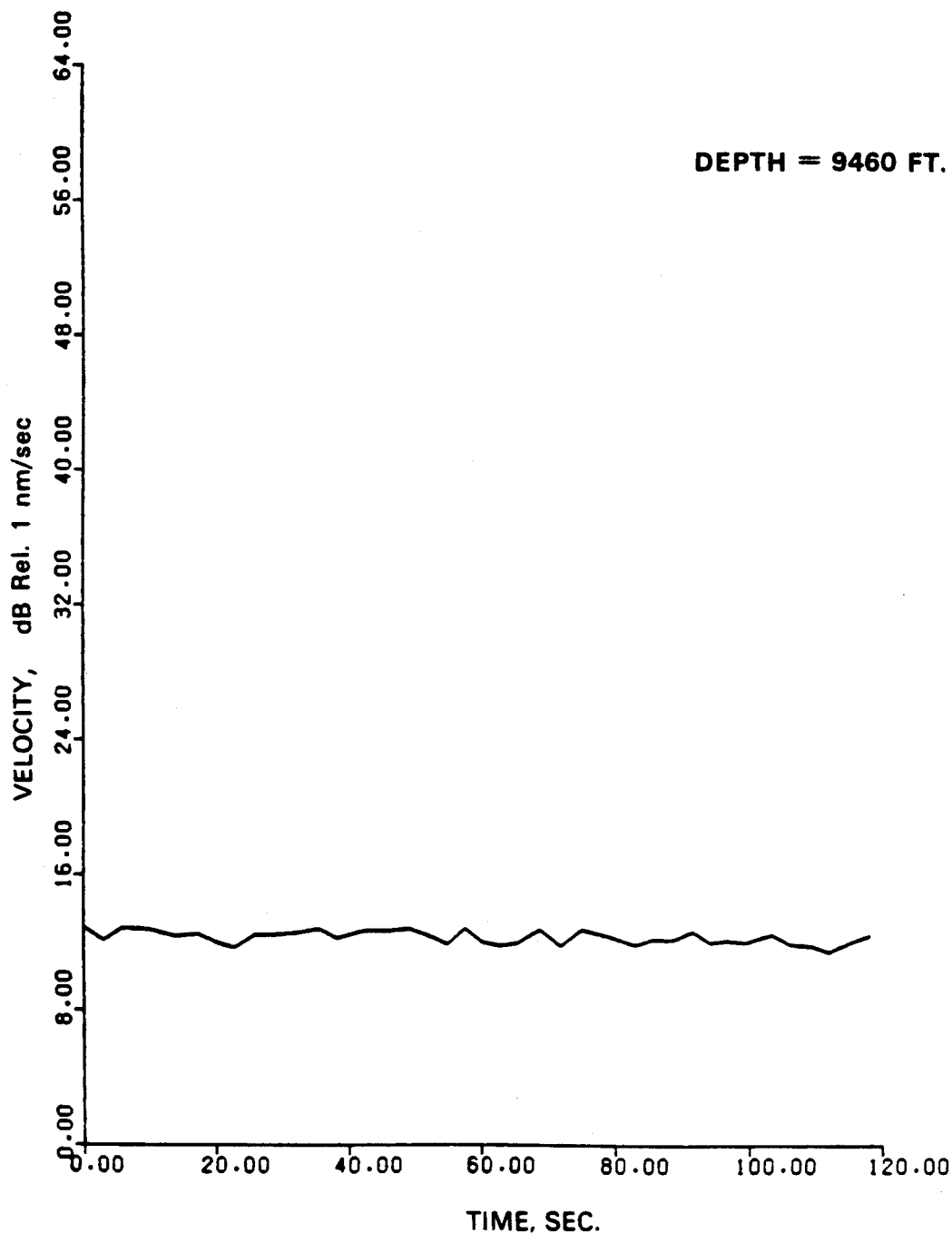
FIGS. 17 and 18 are plots similar to FIGS. 15 and 16 from which data above a selected amplitude has been removed, using an amplitude distribution filter (ADF)
Figure 18:
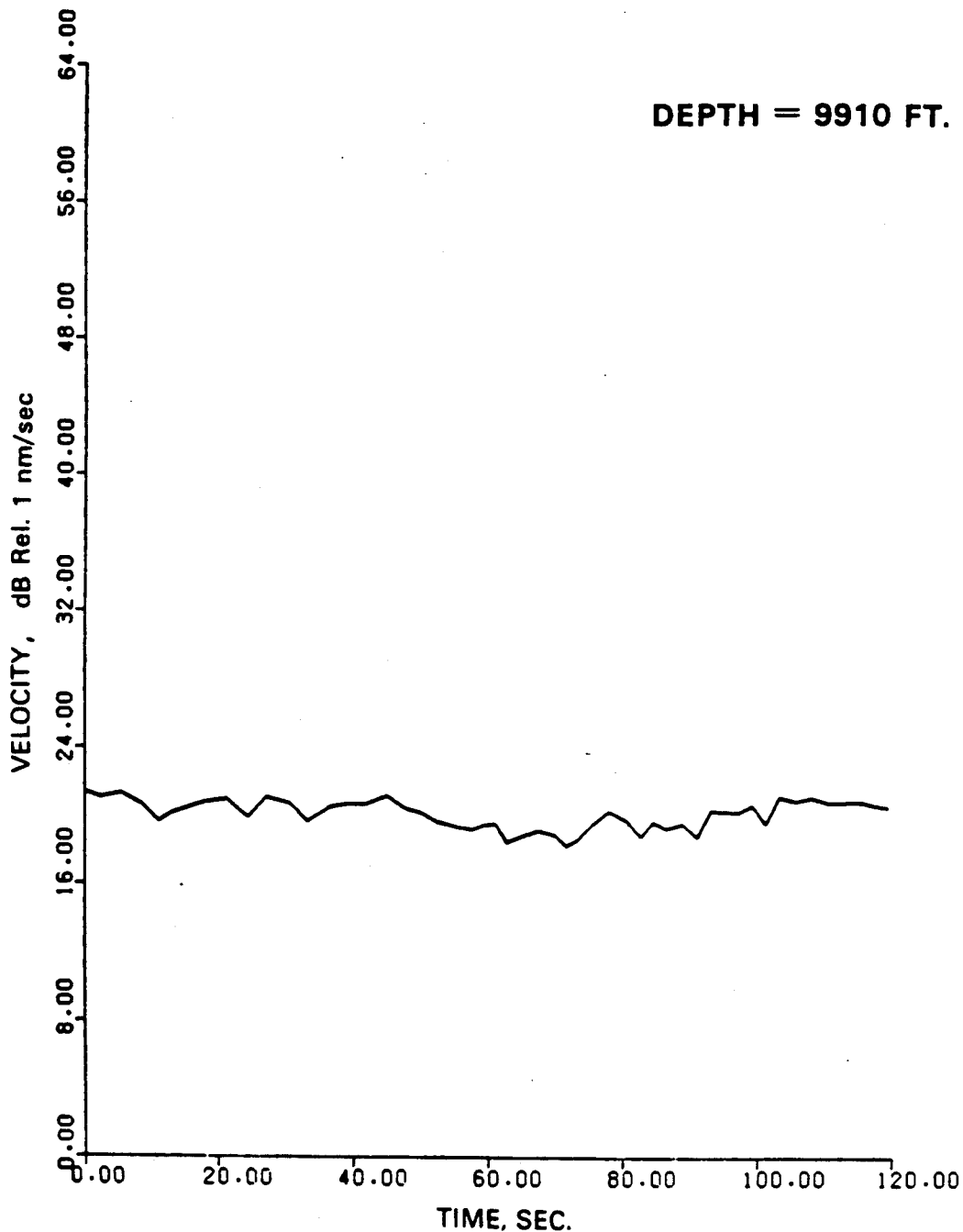

An ADF was computed and applied to the data at each recording depth. Of the original 3000 RMS total motion data described above, the number of data points retained after the ADF were 2512 and 1712 at the 9460 ft. and 9910 ft. depths, respectively. Representative plots of the resulting total motion RMS's after the application of the ADF at the 9460 ft. 9910 ft. depths are shown in FIGS. 17 and 18, respectively.

Calculation and Plotting of H/Z for Twice Filtered Total Motion RMS

Figure 19:
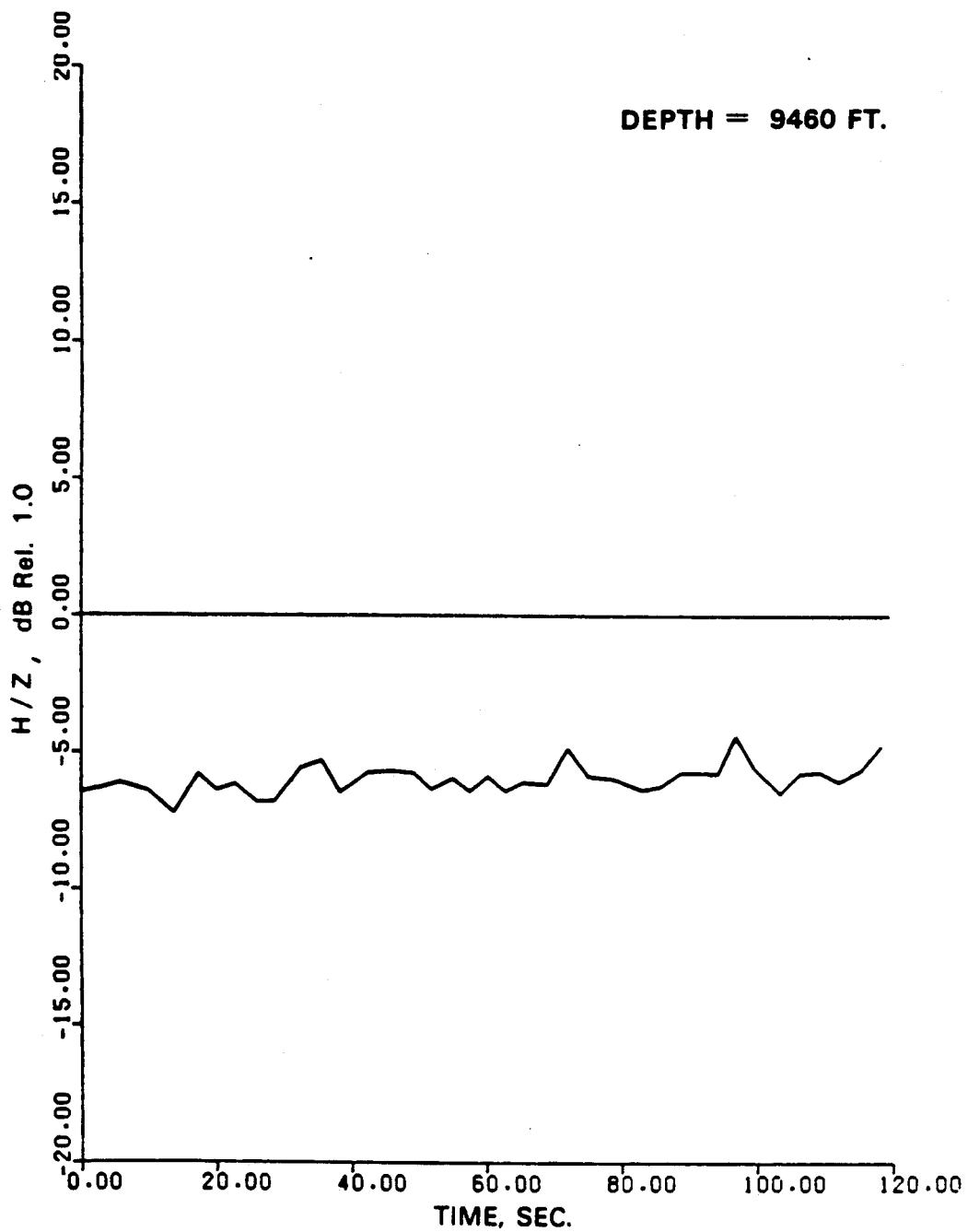
FIGS. 19 and 20 are plots of H/Z for each total motion RMS value remaining as indicated in FIGS. 17 and 18.
Figure 20:
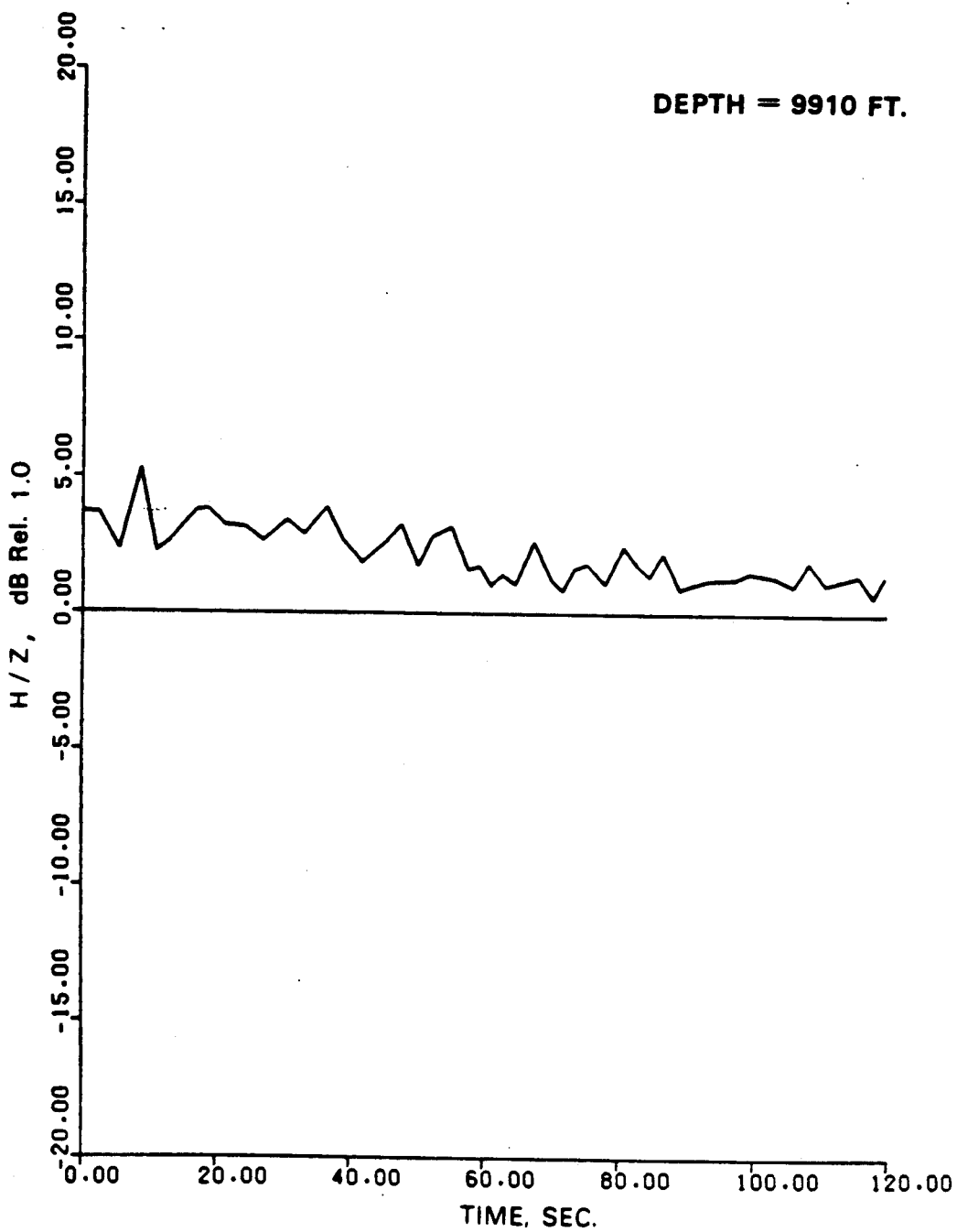

For each total motion RMS value retained after the application of the ADF, the corresponding ratio of the horizontal RMS values, denoted H/Z, was found. FIGS. 19 and 20 show plots of H/Z for the 9460 ft. and 9910 ft. depths, respectively.

Calculation and Bar Plotting of Average H/Z at Each Depth

In the final step of the processing, the average value of H/Z at each recording depth is calculated from the values of H/Z described above. The average values of H/Z at the 9460 ft. and 9910 ft. depths are 0.525 (or −5.6 dB) and 1.251 (or 1.94 dB), respectively. Note that at 9460, H/Z is less than 1.0 or, equivalently, Z is greater than H; while at 9910, H/Z is greater than 1.0 or H is greater than Z.

To complete the procedure, the values of the average H/Z are plotted as a function of recording depth. FIG. 21 is a bar graph of such plot in decibels. Note, the depth scale on left side of the figure. Also indicated in FIG. 21 is the location of the well casing perforations. The perforations or perf. interval is noted since this is the nucleation point from which the fracturing grows into the formation.

Analysis of The Bar Graphs

FIG. 21 shows the average H/Z values for three different deployments within the same well. FIG. 21(a) was calculated from data recorded before fracturing and displays data which has not been frequency filtered (i.e. all frequencies are present). FIG. 21(b) was calculated from data recorded during the mini-frac shut-in and was frequency filtered with a 75 Hz high pass filter. FIG. 21(c) was calculated from data recorded during a pressurization after the well had a massive fracture treatment four months earlier. The data in FIG. 21(c) also did not require frequency filtering. In all cases in FIG. 21 an ADF was used. The values of H/Z at the 9460 ft. and 9910 ft. depths are indicated in FIG. 21(b) by the A and B.

FIG. 21(a) illustrates some features typical of pre-treatment RMS ratios. First, the H/Z values at all depths are positive. The positiveness of H/Z in this pre-treatment data is present in all frequency bands of the data. However, the causes of the positiveness of H/Z in these data changes for different frequencies. For example, for frequencies above approximately 50 H/Z the value of H/Z would be about the square root of 2.0 (3 decibels in the figure). This value will be explained below. The positiveness in FIG. 21(a) indicates that the dominant direction of motion in a well in an unfractured setting is always horizontal. It also shows no dependence or systematic variation of H/Z on the in situ conditions within the surrounding formation prior to fracturing.

A second feature in FIG. 21(a) is the large amplitudes of the H/Z values. Although the data recorded during this phase were small, the amplitude of H/Z is large compared to the other two plots in FIG. 21. This is a result of the low pre-treatment ground motion amplitude being overwhelmed by spurious motion of the sonde.

The sonde is employed in such a manner as to wobble or resonate in predominantly horizontal directions. The resonant frequency of the sonde wobble is typically between 30 and 50 Hz. At the low level of motion in the pre-treatment well, this horizontal sonde resonance dominates over the motion within the well. At frequencies above the tool resonance frequency, the pre-treatment motion is very nearly random and affects the three motion directions of the sonde equivalently. Since the H/Z ratio is based on an RMS calculation in which the two horizontals are summed, with only one vertical, the average H/Z is the square root of 2 which is the typical value found in the data. If the data used for FIG. 21(a) were 50 Hz high pass filtered the amplitude of H/Z in the plots would all be approximately the same and equal to the square root of 2.

In contrast to the pre-treatment H/Z, the post-treatment H/Z in FIG. 21 show a systematic variation. H/Z is no longer positive at all depths. At the shallower recording depths H is now less than Z (i.e. negative H/Z in decibels). Or, equivalently, at the shallower depths the dominant direction of the background motion is vertical. Conversely, at the deeper recording depths, H is greater than Z meaning the background motion is dominantly horizontal. This inversion in H/Z is very abrupt and spatially divides the recording stations into two types of regions. These regions are contiguous and are defined by the dominance of H over Z or vice versa.

Note that the amplitude of H/Z in FIGS. 21(b) and 21(c) may vary within the regions defined by the H/Z dominance inversion. These amplitude variations are not significant and can be a result of a number of effects including the bonding between the well casing and the surrounding rock and the coupling between the sonde and the well casing.

Based on results shown in FIG. 21, the partitioning of the recording depths based on the inversion of the H/Z ratio is a result of the spatial extent of the treatment fracturing. This is an easy conclusion to draw from FIG. 21 since this effect is seen only in post-fracture data sets and not in the pre-fracture data. Based on this conclusion the H/Z inversion point in FIG. 21 indicates the top of the fracture. Note that although FIGS. 21(b) and 21(c) show the same type of variation in H/Z, the inversion point (top of the fracture) in 21(c) is shallower than in 21(b), indicating a higher fracture in 21(c). This is consistent with the operation producing the fracturing since 21(b) was recorded after a mini or small fracture operation while 21(c) was recorded after a massive fracture operation. No bottom of the fracture is indicated in FIG. 21 because the bottom of the fracture extended below the bottom of the well, the deepest accessible point.

As stated at the beginning of this example, the method being illustrated is designed to determine the depth and height of the fracturing produced by a hydraulic fracture treatment. FIG. 21 demonstrates the end result of this method.

I claim:

1. The method of determining the depth of a zone of hydraulic fracture proximate to a wellbore following the application of hydraulic pressure within the bore of a well to cause fracturing in the geological environment around the bore, comprising:
   a. while the wellbore is still pressurized, positioning a motion detector at spaced depths within the bore during a time following the cessation of the application of hydraulic pressure, such depths extending vertically beyond at least one vertical limit of the zone of the anticipated vertical extent of the fracture,
   b. sensing and recording seismic wave motion for a period of time at each depth, such wave motion having a combined pre-pressurization plus pressure-induced background level with two horizontal components and a vertical component and having motion components from sources not attributable to the fracturing,
   c. analyzing such motion recordings at each depth, including
      (1) eliminating motion components not attributable to the fracturing,
      (2) determining the average background level of motion for the two combined horizontal components and for the vertical component of motion as measured by the motion detector,
      (3) and comparing the average background level of motion for the combined horizontal components of motion to the vertical component of motion, whereby the ratio of the horizontal to the vertical components provides an indication of the presence or absence of fracturing at such depth.

2. The method of claim 1 in which the wave motion includes discrete signal components from sources attributable to the fracturing and in which such discrete signal components are eliminated in determining the average background level.

3. The method of claim 1, and positioning a motion detector at various depths within the bore prior to the application of hydraulic pressure and sensing and recording any motion for a period of time at each of such depths in order to provide a pre-pressurized baseline level of motion and a pre-pressurized baseline level of the ratio of the horizontal to the vertical component of motion.

4. The invention of claim 3, and comparing the processed data made prior to the application of hydraulic pressure to those made after the cessation of the application of hydraulic pressure.

5. The method of claim 1 in which the application of hydraulic pressure is a mini-frac treatment.

6. The method of claim 1 in which the application of hydraulic pressure is a water-based treatment.

7. The method of claim 1 in which the application of hydraulic pressure is a massive hydraulic fracture treatment.

8. The method of claim 1 in which the application of hydraulic pressure is a proppant emplacement treatment.

9. The method of claim 1 in which the motion detector is a sonde, and the sonde is connected to electrical linkage including a recording unit on the surface.

10. The method of claim 1 in which the motion detector is a sonde, and the sonde is connected to electrical linkage including a recording unit within the wellbore.

11. The invention of claim 1 in which the two horizontal components of motion are vectorially combined to create a total horizontal motion, and a single root-mean-square value is calculated for such horizontal motion and compared with the root-mean-square value of the vertical motion.

12. The invention of claim 11 in which the logarithm of the ratio of the horizontal and vertical components is calculated whereby such ratio having values of zero to one are negative and values greater than one are positive, such positive values indicating the presence of fracturing at such depth.

13. The method of determining the depth of a zone of hydraulic fracture proximate to a wellbore following the application of hydraulic pressure within a previously hydraulically fractured well (the bore of a well to cause fracturing in the geological environment around the bore), comprising:
   a. While the wellbore is still pressurized, positioning a motion detector at spaced depths within the bore during a time following the cessation of the application of hydraulic pressure, such depths extending vertically beyond at least one vertical limit of the zone of the anticipated vertical extent of the fracture,
   b. sensing and recording seismic wave motion for a period of time at each depth, such wave motion having a combined pre-pressurization plus pressure-induced background level with two horizontal components and a vertical component and having motion components from sources not attributable to the fracturing,
   c. analyzing such motion recordings at each depth, including
      (1) eliminating motion components not attributable to the fracturing, (2) determining the combined pre-pressurization plus pressure-induced average background level of the two combined horizontal components and of the vertical components of motion as measured by the motion detector, (3) and comparing the average background level of motion for the combined horizontal components of motion to the vertical component of motion, whereby the ratio of the horizontal to the vertical components provides an indication of the presence or absence of fracturing at such depth.

14. The method of claim 13, and positioning a motion detector at various depths with the bore prior to the application of hydraulic pressure and sensing and recording any motion for a period of time at each of such depths in order to provide a pre-pressurized baseline level of motion and baseline level of the ratio of the horizontal to the vertical component of motion.

15. The invention of claim 13, and comparing the processed data made prior to the application of hydraulic pressure to those made after the cessation of the application of hydraulic pressure.

16. The method of claim 13 in which the application of hydraulic pressure occurs after the completion of a mini-frac treatment.

17. The method of claim 13 in which the application of hydraulic pressure occurs after the completion of a water-based hydraulic fracture treatment.

18. The method of claim 13 in which the application of hydraulic pressure occurs after the completion of a massive hydraulic fracture treatment.

19. The method of claim 13 in which the application of hydraulic pressure occurs after the completion of a proppant emplacement treatment.

20. The method of claim 13 in which the motion detector is a sonde, and the sonde is connected to electrical linkage including a recording unit on the surface.

21. The method of claim 13 in which the motion detector is a sonde, and the sonde is connected to electrical linkage including a recording unit within the wellbore.

22. The invention of claim 13 in which the motion elements that are eliminated are individually identifiable signals that are either induced by the pressure treatment or from an outside source.

23. The invention of claim 13 in which the two horizontal components of motion are vectorially combined to create a total horizontal motion, and a single root-mean-square value is calculated for such horizontal motion and compared with the root-mean-square value of the vertical motion.

24. The invention of claim 22 in which the two horizontal components of motion are vectorially combined to create a total horizontal motion, and a single root-mean-square value is calculated for such horizontal motion and compared with the root-mean-square value of the vertical motion.

25. The invention of claim 23 in which the logarithm of the ratio of the horizontal and vertical components is calculated whereby such ratio having values of zero to one are negative and values greater than one are positive, such positive values indicating the presence of fracturing at such depth.

26. The invention of claim 24 in which the logarith of the ratio of the horizontal and vertical components is calculated whereby such ratio having values of zero to one are negative and values greater than one are positive, such positive values indicating the presence of fracturing at such depth.

27. The method of determining the depth of a zone of hydraulic fracture proximate to a wellbore following the application of hydraulic pressure within the bore of a well to cause fracturing in the geological environment around the bore, comprising:

a. while the wellbore is still pressurized, positioning a motion detector at spaced depths within the bore during a time following the cessation of the application of hydraulic pressure, such depths extending vertically beyond at least one vertical limit of the zone of the anticipated vertical extent of the fracture, b. sensing and recording seismic wave motion for a period of time at each depth, such wave motion having a combined pre-pressurization plus pressure-induced background level with two horizontal components and a vertical component and having motion components from sources not attributable to the fracturing, and having discrete signal components from sources attributable to the fracturing, c. analyzing such motion recordings at each depth, including (1) eliminating motion components not attributable to the fracturing, (2) eliminating discrete signal components from sources attributable to the fracturing, (3) determining the average background level of the two combined horizontal components and of the vertical component of motion as measured by the motion detector, (4) and comparing the average background level of motion for the combined horizontal components of motion to the vertical component of motion, whereby the ratio of the horizontal to the vertical components provides an indication of the presence or absence of fracturing at such depth.

28. The method of claim 27, and positioning a motion detector at various depths within the bore prior to the application of hydraulic pressure and sensing and recording any motion for a period of time at each of such depths in order to provide a pre-pressurized baseline level of motion and a pre-pressurized baseline level of the ratio of the horizontal to the vertical component of motion.

29. The invention of claim 28, and comparing the processed data made prior to the application of hydraulic pressure to those made after the cessation of the application of hydraulic pressure.

30. The method of claim 27 in which the application of hydraulic pressure is a mini-frac treatment.

31. The method of claim 27 in which the application of hydraulic pressure is a water-based treatment.

32. The method of claim 27 in which the application of hydraulic pressure is a massive hydraulic fracture treatment.

33. The method of claim 27 in which the application of hydraulic pressure is a proppant emplacement treatment.

34. The method of claim 27 in which the motion detector is a sonde, and the sonde is connected to electrical linkage including a recording unit on the surface.

35. The method of claim 27 in which the motion detector is a sonde, and the sonde is connected to electrical linkage including a recording unit within the wellbore.

36. The invention of claim 27 in which the motion elements that are eliminated are individually identifiable signals that are either induced by the pressure treatment or from an outside source.

37. The invention of claim 27 in which the two horizontal components of motion are vectorially combined to create a total horizontal motion, and a single root-mean-square value is calculated for such horizontal motion and compared with the root-mean-square value of the vertical motion.

38. The invention of claim 36 in which the two horizontal components of motion are vectorially combined to create a total horizontal motion, and a single root-mean-square value is calculated for such horizontal motion and compared with the root-mean-square value of the vertical motion.

39. The invention of claim 37 in which the logarithm of the ratio of the horizontal and vertical components is calculated whereby such ratio having values of zero to one are negative and values greater than one are positive, such positive values indicating the presence of fracturing at such depth.

40. The invention of claim 38 in which the logarithm of the ratio of the horizontal and vertical components is calculated whereby such ratio having values of zero to one are negative and values greater than one are positive, such positive values indicating the presence of fracturing at such depth.

* * * * *